US012132331B2

(12) United States Patent
Kim et al.

(10) Patent No.: US 12,132,331 B2
(45) Date of Patent: Oct. 29, 2024

(54) WIRELESS POWER TRANSMISSION APPARATUS, WIRELESS POWER RECEPTION APPARATUS, AND WIRELESS CHARGING SYSTEM

(71) Applicant: LG ELECTRONICS INC., Seoul (KR)

(72) Inventors: Kyunghwan Kim, Seoul (KR); Seonghun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/025,634

(22) PCT Filed: Sep. 28, 2021

(86) PCT No.: PCT/KR2021/013167
§ 371 (c)(1),
(2) Date: Mar. 9, 2023

(87) PCT Pub. No.: WO2022/097915
PCT Pub. Date: May 12, 2022

(65) Prior Publication Data
US 2023/0369916 A1 Nov. 16, 2023

(30) Foreign Application Priority Data
Nov. 3, 2020 (KR) .................. 10-2020-0145139

(51) Int. Cl.
*H02J 50/70* (2016.01)
*H02J 50/12* (2016.01)
*H02J 50/40* (2016.01)

(52) U.S. Cl.
CPC .............. *H02J 50/70* (2016.02); *H02J 50/12* (2016.02); *H02J 50/402* (2020.01)

(58) Field of Classification Search
CPC .......... H02J 50/402; H02J 50/80; H02J 50/90; H02J 50/12; H02J 50/60; H02J 7/02;
(Continued)

(56) References Cited

U.S. PATENT DOCUMENTS

2012/0146643 A1* 6/2012 Saha ................ G01R 33/34076
324/318
2018/0091000 A1* 3/2018 Jol ........................... H04B 5/24
(Continued)

FOREIGN PATENT DOCUMENTS

KR    1020160090420    8/2016
KR    1020180060102    6/2018
(Continued)

OTHER PUBLICATIONS

PCT International Application No. PCT/KR2021/013167, International Search Report dated Jan. 12, 2022, 5 pages.

*Primary Examiner* — Lincoln D Donovan
*Assistant Examiner* — Alex W Lam
(74) *Attorney, Agent, or Firm* — LEE, HONG, DEGERMAN, KANG & WAIMEY

(57) ABSTRACT

A wireless power transmission apparatus comprises: a plurality of transmission coils configured to transmit a wireless power to a wireless power reception apparatus; a shielding coil which is arranged on at least one surface of a dielectric substrate, and is configured in a loop shape having at least two turns so as to surround the plurality of transmission coils; and a capacitor configured to connect one point to the other point of the shielding coil. The plurality of transmission coils are arranged inside the shielding coil disposed on the dielectric substrate, and the direction of a magnetic field formed at one side and the other side of the plurality of transmission coils adjacent to the shielding coil is formed to be opposite to the direction of a magnetic field formed around the shielding coil so that the shielding coil shields (Continued)

(a)

(b)

external exposure of electromagnetic waves by the plurality of transmission coils.

17 Claims, 24 Drawing Sheets

(58) Field of Classification Search
CPC .......... H02J 50/40; H02J 50/10; H01F 38/14; H04B 5/0037; H04L 27/02; H04L 27/04
See application file for complete search history.

(56) References Cited

U.S. PATENT DOCUMENTS

2018/0177075 A1* 6/2018 Kweon ................. H01F 27/366
2019/0371515 A1* 12/2019 Ha ........................... H02J 50/70

FOREIGN PATENT DOCUMENTS

| KR | 101964428 | 4/2019 |
|----|-----------|--------|
| KR | 20200031285 | 3/2020 |
| WO | 2018081455 | 5/2018 |

* cited by examiner (a)

(b)

(c)

(a)

(b)

(a)

(b)

(a)

(b)

(a)

(b)

(a)  (b)

(c)  (d)

WIRELESS POWER TRANSMISSION APPARATUS, WIRELESS POWER RECEPTION APPARATUS, AND WIRELESS CHARGING SYSTEM

CROSS-REFERENCE TO RELATED APPLICATIONS

This application is the National Stage filing under 35 U.S.C. 371 of International Application No. PCT/KR2021/013167, filed on Sep. 28, 2021, which claims the benefit of earlier filing date and right of priority to Korean Application No. 10-2020-0145139, filed on Nov. 3, 2020, the contents of which are all incorporated by reference herein in their entirety.

TECHNICAL FIELD

The present disclosure relates to a wireless power transmission apparatus, a wireless power reception apparatus, and a wireless charging system in the field of wireless power transmission.

BACKGROUND ART

Instead of a method of supplying electrical energy to wireless power reception apparatuses in a wired manner, a method of wirelessly supplying electric energy without contact has been used in recent years. A wireless power reception apparatus that receives energy wirelessly may be driven directly by the received wireless power, or may be driven by power which is charged in a battery using the received wireless power.

A wireless power transmission apparatus may transmit wireless power to one or more wireless power reception apparatuses. To this end, the wireless power transmission apparatus may include a plurality of transmission coils. A wireless power transmission apparatus having a plurality of transmission coils has a problem in that electromagnetic waves leaking to an external region increase.

Meanwhile, in order to solve the problem of increasing leakage electromagnetic waves, there is a problem in that switching circuit and control complexity increases when individually switching transmission coils disposed in a region other than a region in which the wireless power reception apparatus is disposed. Furthermore, when a plurality of wireless power reception apparatuses are disposed in the wireless power transmission apparatus, all transmission coils may need to be driven. Accordingly, when the plurality of wireless power reception apparatuses are disposed, there is a problem in that the transmission coils cannot be individually driven.

DISCLOSURE OF INVENTION

Technical Problem

An aspect of the present disclosure is to provide a wireless power transmission apparatus and a wireless power transmission system that secure a wide active area and ensure a degree of positional freedom of wireless charging.

Another aspect of the present disclosure is to provide a wireless power transmission apparatus and a wireless power transmission system that shield leakage electromagnetic waves leaking to an external region while maintaining wireless charging efficiency.

Still another aspect of the present disclosure is to provide a wireless power transmission apparatus and a wireless power transmission system that shield leakage electromagnetic waves leaking to an external region while securing a wide active area when charging one or more electronic devices.

Yet still another aspect of the present disclosure is to provide a wireless power transmission apparatus and a wireless power transmission system that shield leakage electromagnetic waves leaking to an external region while securing a degree of positional freedom of wireless charging when charging one or more electronic devices.

Solution to Problem

A wireless power transmission apparatus according to the present specification may include a plurality of transmission coils configured to transmit wireless power to a wireless power reception apparatus; a shielding coil disposed on at least one surface of a dielectric substrate, and configured in a loop shape having two or more turns to surround the plurality of transmission coils; and a capacitor configured to connect one point and another point of the shielding coil. The plurality of transmission coils may be disposed inside the shielding coil disposed on the dielectric substrate, and a direction of a magnetic field formed on one side and the other side of the plurality of transmission coils adjacent to the shielding coil may be formed in an opposite direction to a magnetic field formed on the shielding coil such that the shielding coil is configured to shield external exposure of electromagnetic waves due to the plurality of transmission coils.

According to an embodiment, a resonant frequency of the shielding coil due to an inductance component of the shielding coil and a capacitance component of the capacitor may be set to a frequency lower than a wireless charging operating frequency due to the plurality of transmission coils.

According to an embodiment, the capacitance value may be set such that a first impedance due to an inductance component of the plurality of transmission coils and the shielding coil is 10 times greater than a second impedance due to a capacitance value of the capacitor connected to the shielding coil. Due to the set capacitance value, a phase value of a current flowing through the shielding coil and a phase value of a current flowing through the transmission coil may be an out-of-phase relationship.

According to an embodiment, the plurality of transmission coils may include an upper coil disposed on a first layer; a first lower coil disposed on a second layer that is a lower layer of the first layer to overlap one side of the upper coil; and a second lower coil disposed on the second layer to overlap the other side of the upper coil. One side of the first lower coil and the other side of the second lower coil may be disposed in parallel to and spaced apart from the shielding coil.

According to an embodiment, the plurality of transmission coils may be disposed inside a hole disposed in the dielectric substrate.

According to an embodiment, the shielding coil may include a first shielding coil disposed on one surface of the dielectric substrate to surround the plurality of transmission coils; and a second shielding coil disposed on the other surface of the dielectric substrate to surround the plurality of transmission coils.

According to an embodiment, a shape of the second shielding coil may correspond to that of the first shielding coil, and a second region of a rear surface of the dielectric substrate on which the second shielding coil is disposed may correspond to a first region of a front surface of the dielectric substrate on which the first shielding coil is disposed. A shape of a corner portion on one side where the second shielding coil is disposed may be defined to be different from that of a corner portion on one side where the first shielding coil is disposed.

According to an embodiment, the capacitor may be configured to connect an inner end portion and an outer end portion of either one of the first shielding coil and the second shielding coil. The first shielding coil may be defined in a two-turn closed loop shape on one surface of the dielectric substrate, and the second shielding coil may be defined in a two-turn closed loop shape on the other surface of the dielectric substrate.

According to an embodiment, the wireless power transmission apparatus may further include a first communication module that detects a wireless power reception apparatus located in any one of power transmission areas corresponding to the plurality of transmission coils, respectively. The wireless power transmission apparatus may further include a control unit configured to transmit wireless power to a wireless power reception apparatus located in any one of the power transmission areas and to control the capacitor so as to shield electromagnetic wave exposure due to the transmission of wireless power.

According to an embodiment, the wireless power transmission apparatus may further include a switch disposed between the capacitor and the shielding coil to control the capacitor to be connected to or opened from the shielding coil. The control unit may control the switch to connect the capacitor to the shielding coil so as to shield electromagnetic wave exposure due to the transmission of wireless power when it is determined that the wireless power reception apparatus is disposed on the upper coil. The control unit may control the switch to open the capacitor so as not to be connected to the shielding coil when it is determined that the wireless power reception apparatus is disposed on the first lower coil or the second lower coil.

According to an embodiment, the control unit may control the switch to connect the capacitor to the shielding coil so as to shield electromagnetic wave exposure due to the transmission of wireless power when it is determined that the wireless power reception apparatus is disposed on the first lower coil or the second lower coil and the electromagnetic wave exposure due to the transmission of wireless power is above a threshold value.

According to an embodiment, the wireless power transmission apparatus may further include a second communication module that transmits and receives a power control message to and from a wireless power reception apparatus in response to the detection of the wireless power reception apparatus located in one of the power transmission areas through the first communication module. The control unit may control the switch to transmit wireless power to a wireless power reception apparatus located in one of the power transmission areas and to shield electromagnetic wave exposure due to the transmission of wireless power based on the power control message.

According to an embodiment, a shape of the upper coil may be defined in a form in which a plurality of coils wound in a rectangular shape, and a corner portion of the upper coil may be defined in a round shape. The upper coil may be configured with a rectangular coil having an inner diameter and an outer diameter. A first coil region on one side of the first lower coil and a second coil region on the other side of the second lower coil may be disposed in an inner region of the upper coil.

According to an embodiment, a shape of the first and second lower coils may be defined in a form in which a plurality of coils are wound in a rectangular shape, and corner portions of the first and second lower coils may be defined in a round shape. The first and second lower coils may be configured with rectangular coils having an inner diameter and an outer diameter. The other side of the first lower coil and one side of the second lower coil may be disposed adjacent to and spaced apart from the shielding coil, and configured to shield electromagnetic wave exposure due to wireless power transmission.

According to an embodiment, the capacitor may be configured with a variable capacitor. The control unit may control the variable capacitor such that a resonant frequency of the shielding coil is set to a frequency lower than a wireless charging operating frequency due to the plurality of transmission coils.

According to an embodiment, the control unit may control the variable capacitor to have a frequency lower than the wireless charging operating frequency while increasing the resonant frequency of the shielding coil when an amount of power is above a threshold value according to wireless power transmission.

According to an embodiment, a first distance between a boundary of the other side of the first lower coil and the shielding coil and a second distance between a boundary of one side of the second lower coil and the shielding coil may be set to be below a first threshold distance. A third distance between an upper end portion of the plurality of transmission coils and the shielding coil and a fourth distance between a lower end portion of the plurality of transmission coils and the shielding coil may be set to be below a second threshold distance.

There is provided a wireless power transmission system including a wireless power transmission apparatus and a wireless power reception apparatus according to another aspect of the present specification. The wireless power transmission system may include a plurality of transmission coils configured to transmit wireless power to a wireless power reception apparatus; a shielding coil disposed on at least one surface of a dielectric substrate, and configured in a loop shape having two or more turns to surround the plurality of transmission coils, and a wireless power transmission apparatus comprising a capacitor configured to be connected to the shielding coil at one point of the shielding coil. The wireless power transmission system may further include a wireless power reception apparatus provided with a reception coil to receive wireless power from the wireless power transmission apparatus.

According to an embodiment, the plurality of transmission coils may be disposed inside the shielding coil disposed on the dielectric substrate. A direction of a magnetic field formed on one side and the other side of the plurality of transmission coils adjacent to the shielding coil may be formed in an opposite direction to a magnetic field formed on the shielding coil such that the shielding coil is configured to shield external exposure of electromagnetic waves due to the plurality of transmission coils.

According to an embodiment, the wireless power transmission apparatus may further include a first communication module that detects a wireless power reception apparatus located in any one of power transmission areas corresponding to the plurality of transmission coils, respectively. The wireless power transmission apparatus may further include a control unit configured to transmit wireless power to a wireless power reception apparatus located in the any one of the power transmission areas and to control the capacitor so as to shield electromagnetic wave exposure due to the transmission of wireless power.

According to an embodiment, the plurality of transmission coils may include an upper coil disposed on a first layer; a first lower coil disposed on a second layer that is a lower layer of the first layer to overlap one side of the upper coil; and a second lower coil disposed on the second layer to overlap the other side of the upper coil, According to an embodiment, the wireless power transmission apparatus further may further include a switch disposed between the capacitor and the shielding coil to control the capacitor to be connected to or opened from the shielding coil. The control unit may control the switch to connect the capacitor to the shielding coil so as to shield electromagnetic wave exposure due to the transmission of wireless power when it is determined that the wireless power reception apparatus is disposed on the upper coil. The control unit may control the switch to open the capacitor so as not to be connected to the shielding coil when it is determined that the wireless power reception apparatus is disposed on the first lower coil or the second lower coil.

Advantageous Effects of Invention

According to the present specification, when charging one or more electronic devices, it may be possible to secure a wide active area and ensure a degree of positional freedom of wireless charging.

According to the present specification, leakage electromagnetic waves leaking to an external region may be shielded while maintaining wireless charging efficiency.

According to the present specification, when charging one or more electronic devices, leakage electromagnetic waves leaking to an external region may be shielded while securing a wide active area.

According to the present specification, when charging one or more electronic devices, leakage electromagnetic waves leaking to an external region may be shielded while securing a degree of positional freedom of wireless charging.

Further scope of applicability of the present disclosure will become apparent from the detailed description given hereinafter. It should be understood, however, that the detailed description and specific examples, such as the preferred embodiment of the invention, are given by way of illustration only, since various changes and modifications within the spirit and scope of the invention will be apparent to those skilled in the art.

MODE FOR THE INVENTION

Figure 1:
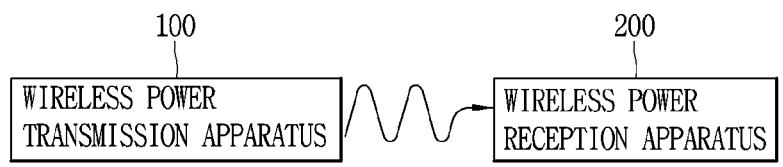
FIG. 1 is an exemplary view conceptually showing a wireless power transmission apparatus and a wireless power reception apparatus according to embodiments of the present disclosure.

The technology disclosed herein is applied to wireless power transmission. However, the technology disclosed herein is not limited thereto, and may be applicable even to all power transmission systems and methods, wireless charging circuits and methods, and other methods and apparatuses that utilize wirelessly transmitted power to which the technical idea of the technology can be applied.

It should be noted that technological terms used herein are merely used to describe a specific embodiment, but not to limit the present disclosure. Also, unless particularly defined otherwise, technological terms used herein should be construed as a meaning that is generally understood by those having ordinary skill in the art to which the disclosure pertains, and should not be construed too broadly or too narrowly. Furthermore, if technological terms used herein are wrong terms unable to correctly express the concept of the disclosure, then they should be replaced by technological terms that are properly understood by those skilled in the art. In addition, general terms used in this disclosure should be construed based on the definition of dictionary, or the context, and should not be construed too broadly or too narrowly.

In addition, the singular expression used in the present specification includes a plurality of expressions unless the context clearly indicates otherwise. In this application, the terms "comprising" and "including" should not be construed to necessarily include all of the elements or steps disclosed herein, and should be construed not to include some of the elements or steps thereof, or should be construed to further include additional elements or steps.

A suffix "module" and "unit" used for constituent elements disclosed in the following description is merely intended for easy description of the specification, and the suffix itself does not give any special meaning or function.

Furthermore, in the present disclosure, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the disclosure.

Hereinafter, embodiments of the present disclosure will be described in detail with reference to the accompanying drawings, and the same reference numerals are used to designate the same/like components and redundant description thereof will be omitted.

In describing the present disclosure, moreover, the detailed description will be omitted when a specific description for publicly known technologies to which the invention pertains is judged to obscure the gist of the present disclosure. Also, it should be noted that the accompanying drawings are merely illustrated to easily explain the concept of the disclosure, and therefore, they should not be construed to limit the concept of the invention by the accompanying drawings.

Definition

Many-to-one communication: A method of communicating between one transmitter (Tx) and many receivers (Rx)

Unidirectional communication: A method of transmitting a required message only from a receiver to a transmitter Bidirectional communication: A communication method allowing message transmission from a transmitter to a receiver and from a receiver to a transmitter, namely, in a bidirectional manner Here, the transmitter and the receiver indicate the same as a transmission apparatus and a reception apparatus, respectively, and hereinafter, those terms may be used interchangeably.

Conceptual View of Wireless Power Transmission Apparatus and Wireless Power Reception Apparatus FIG. 1 is an exemplary view conceptually showing a wireless power transmission apparatus and a wireless power reception apparatus according to embodiments of the present disclosure.

Referring to FIG. 1, the wireless power transmission apparatus 100 may be a power transmission apparatus or device configured to transmit power required for the wireless power reception apparatus 200 in a wireless manner.

Furthermore, the wireless power transmission apparatus 100 may be a wireless charging apparatus or device configured to charge a battery of the wireless power reception apparatus 200 by transmitting power in a wireless manner.

Additionally, the wireless power transmission apparatus 100 may be implemented with various forms of apparatuses or devices transmitting power to the wireless power reception apparatus 200 requiring power in a contactless state.

The wireless power reception apparatus 200 is a device that is operable by receiving power from the wireless power transmission apparatus 100 in a wireless manner. Also, the wireless power reception apparatus 200 may charge a battery using the received wireless power.

On the other hand, a wireless power reception apparatus for receiving power in a wireless manner as described herein should be construed broadly to include a portable phone, a cellular phone, a smart phone, a personal digital assistant (PDA), a portable multimedia player (PMP), a tablet, a multimedia device, or the like, in addition to an input/output device such as a keyboard, a mouse, an audio-visual auxiliary device, and the like.

The wireless power reception apparatus 200, as described later, may be a mobile communication terminal (for example, a portable phone, a cellular phone, and a tablet and the like) or a multimedia device.

On the other hand, the wireless power transmission apparatus 100 may transmit power in a wireless manner without mutual contact to the wireless power reception apparatus 200 using one or more wireless power transmission methods. In other words, the wireless power transmission apparatus 100 may transmit power using at least one of an inductive coupling method based on a magnetic induction phenomenon by a wireless power signal and a magnetic resonance coupling method based on an electromagnetic resonance phenomenon by a wireless power signal at a specific frequency.

Wireless power transmission in the inductive coupling method is a technology transmitting power in a wireless manner using a primary coil and a secondary coil, and refers to transmission of power by inducing a current from a coil to another coil through a changing magnetic field by a magnetic induction phenomenon.

Wireless power transmission in the inductive coupling method refers to a technology in which the wireless power reception apparatus 200 generates resonance by a wireless power signal transmitted from the wireless power transmission apparatus 100 to transmit power from the wireless power transmission apparatus 100 to the wireless power reception apparatus 200 by the resonance phenomenon.

Hereinafter, the wireless power transmission apparatus 100 and wireless power reception apparatus 200 according to the embodiments disclosed herein will be described in detail. In assigning reference numerals to the constituent elements in each of the following drawings, the same reference numerals will be used for the same constituent elements even though they are shown in a different drawing.

Figure 2A:
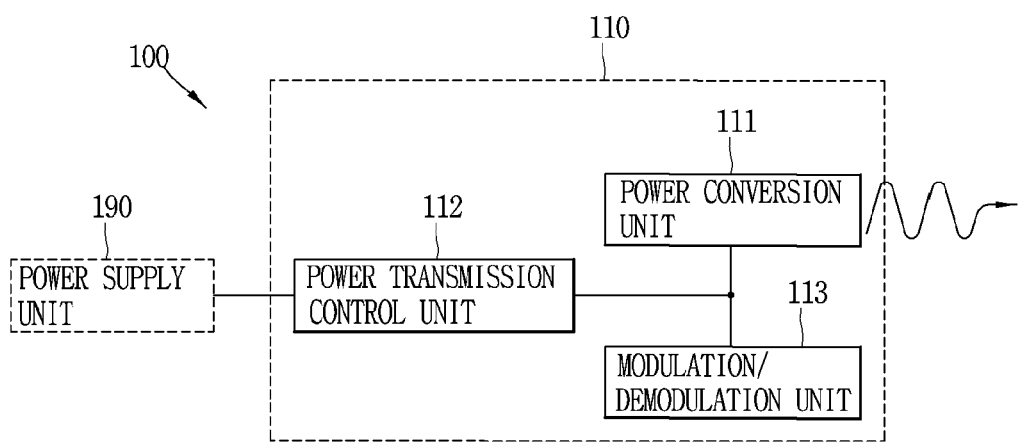
FIGS. 2A and 2B are block diagrams exemplarily showing the configuration of a wireless power transmission apparatus and a wireless power reception apparatus that can be employed in embodiments disclosed herein.
Figure 2B:
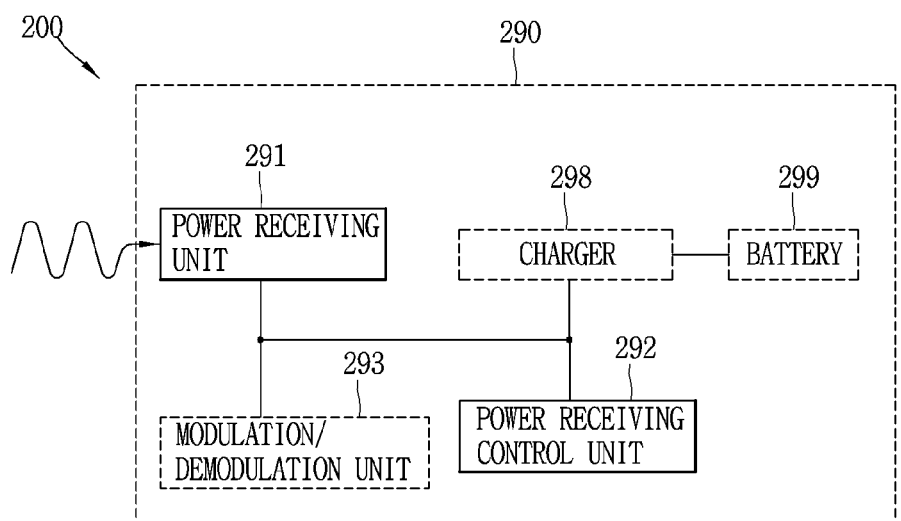

FIGS. 2A and 2B are block diagrams exemplarily illustrating configuration of a wireless power transmission apparatus 100 and a wireless power reception apparatus 200 that can be employed in the embodiments disclosed herein.

Wireless Power Transmission Apparatus

Referring to FIG. 2A, the wireless power transmission apparatus 100 may include a power transmission unit 110. The power transmission unit 110 may include a power conversion unit 111 and a power transmission control unit 112.

The power conversion unit 111 transmits power supplied from a transmission side power supply unit 190 to the wireless power reception apparatus 200 by converting it into a wireless power signal. The wireless power signal transmitted by the power conversion unit 111 is generated in the form of a magnetic field or electro-magnetic field having an oscillation characteristic. For this purpose, the power conversion unit 111 may be configured to include a coil for generating the wireless power signal.

The power conversion unit 111 may include a constituent element for generating a different type of wireless power signal according to each power transmission method. For example, the power conversion unit 111 may include a primary coil for forming a changing magnetic field to induce a current to a secondary coil of the wireless power reception apparatus 200 according to an inductive coupling method. Furthermore, the power conversion unit 111 may include a coil (or antenna) for forming a magnetic field having a specific resonant frequency to generate resonance in the wireless power reception apparatus 200 according to a resonance coupling method.

The power conversion unit 111 may also transmit power using at least one of the foregoing inductive coupling method and the resonance coupling method.

Among the elements included in the power conversion unit 111, those for the inductive coupling method will be described later with reference to FIGS. 4 and 5, and those for the resonance coupling method will be described with reference to FIGS. 7 and 8.

On the other hand, the power conversion unit 111 may further include a circuit for controlling the characteristics of a used frequency, an applied voltage, an applied current or the like to form the wireless power signal.

The power transmission control unit 112 controls each of the constituent elements included in the power transmission unit 110. The power transmission control unit 112 may be implemented to be integrated into another control unit (not shown) for controlling the wireless power transmission apparatus 100.

On the other hand, an area (or region) to which the wireless power signal can be approached may be divided into two types. First, an active area denotes a region through which a wireless power signal transmitting power to the wireless power reception apparatus 200 is passed. Next, a detection area (semi-active area) denotes an interest region in which the wireless power transmission apparatus 100 can detect the presence of the wireless power reception apparatus 200. Here, the power transmission control unit 112 may detect whether the wireless power reception apparatus 200 is placed in the active area or detection area or removed from the area. Specifically, the power transmission control unit 112 may detect whether or not the wireless power reception apparatus 200 is placed in the active area or detection area using a wireless power signal formed from the power conversion unit 111 or a sensor separately provided therein. For instance, the power transmission control unit 112 may detect the presence of the wireless power reception apparatus 200 by monitoring whether or not the characteristic of power for forming the wireless power signal is changed because of affection by the wireless power reception apparatus 200 that is present in the detection area. However, the active area and detection area may vary according to a wireless power transmission method such as an inductive coupling method, a resonance coupling method, and the like.

The power transmission control unit 112 may perform a process of identifying the wireless power reception apparatus 200 or determine whether to start wireless power transfer according to a result of detecting the presence of the wireless power reception apparatus 200.

Furthermore, the power transmission control unit 112 may determine at least one characteristic of a frequency, a voltage, and a current of the power conversion unit 111 for forming the wireless power signal. The determination of the characteristic may be carried out by a condition at the side of the wireless power transmission apparatus 100 or a condition at the side of the wireless power reception apparatus 200.

The power transmission control unit 112 may receive a power control message from the wireless power reception apparatus 200. The power transmission control unit 112 may determine at least one characteristic of a frequency, a voltage and a current of the power conversion unit 111 based on the received power control message, and additionally perform other control operations based on the power control message.

For example, the power transmission control unit 112 may determine at least one characteristic of a frequency, a voltage and a current used to generate the wireless power signal according to the power control message including at least one of rectified power amount information, charging state information and identification information in the wireless power reception apparatus 200.

In addition, as another control operation using the power control message, the wireless power transmission apparatus 100 may perform a typical control operation associated with wireless power transmission based on the power control message. For example, the wireless power transmission apparatus 100 may receive information associated with the wireless power reception apparatus 200 to be auditorily or visually output or receive information required for authentication between devices, through the power control message.

The power transmission control unit 112 may receive the power control message by using at least one of methods, for example, through a wireless power signal or in a manner of receiving user data.

In order to receive the power control message, the wireless power transmission apparatus 100 may further include a power communications modulation/demodulation unit 113 electrically connected to the power conversion unit 111. The modulation/demodulation unit 113 may modulate a wireless power signal that has been modulated by the wireless power reception apparatus 200 and use it to receive the power control message.

In addition, in some exemplary embodiments, the power transmission control unit 112 may acquire such power control message by receiving user data including the power control message through a communication element (not shown) included in the wireless power transmission apparatus 100.

[In Case of Supporting In-band Two-way Communication]

Under a wireless power transfer environment allowing for bi-directional communications according to the exemplary embodiments disclosed herein, the power transmission control unit 112 may transmit data to the wireless power reception apparatus 200. The data transmitted by the power transmission control unit 100 may be transmitted to request the wireless power reception apparatus 200 to send a power control message.

Wireless Power Reception Apparatus

Referring to FIG. 2B, the wireless power reception apparatus 200 may include a power supply unit 290. The power supply unit 290 supplies power required for the operation of the wireless power reception apparatus 200. The power supply unit 290 may include a power reception unit 291 and a power reception control unit 292.

The power reception unit 291 receives power transmitted from the wireless power transmission apparatus 100 in a wireless manner.

The power reception unit 291 may include constituent elements required to receive the wireless power signal according to a wireless power transmission method. In addition, the power reception unit 291 may receive power according to at least one wireless power transmission method, and in this case, the power reception unit 291 may include constituent elements required for each method.

First, the power reception unit 291 may include a coil for receiving a wireless power signal transmitted in the form of a magnetic field or electromagnetic field having an oscillation characteristic.

For instance, as a constituent element according to an inductive coupling method, the power reception unit 291 may include a secondary coil to which a current is induced by a changing magnetic field. The power reception unit 291, as a constituent element according to a resonance coupling method, may also include a coil and a resonant circuit in which a resonance phenomenon is generated by a magnetic field having a specific resonant frequency.

However, when the power reception unit 291 receives power according to at least one wireless power transmission method, the power reception unit 291 may be implemented to receive power by using one coil, or implemented to receive power by using a coil formed differently according to each power transmission method.

Among the elements included in the power reception unit 291, those for the inductive coupling method will be described later with reference to FIG. 4, and those for the resonance coupling method with reference to FIG. 7.

On the other hand, the power reception unit 291 may further include a rectifier and a regulator to convert the wireless power signal into a direct current (DC current). Furthermore, the power reception unit 291 may further include a circuit for protecting overvoltage or overcurrent from being generated by the received power signal.

The power reception control unit 292 may control each constituent element included in the power supply unit 290.

Specifically, the power reception control unit 292 may transmit a power control message to the wireless power transmission apparatus 100. The power control message may instruct the wireless power transmission apparatus 100 to initiate or terminate transmission of the wireless power signal. Also, the power control message may instruct the wireless power transmission apparatus 100 to control the characteristic of the wireless power signal.

The power transmission control unit 292 may receive the power control message by using at least one of methods, for example, through a wireless power signal or in a manner of receiving user data.

In order to transmit the power control message, the wireless power reception apparatus 200 may further include a power communications modulation/demodulation unit 293 electrically connected to the power reception unit 291. Similar to the case of the wireless power transmission apparatus 100, the modulation/demodulation unit 293 may use the wireless power signal to transmit the power control message. The modulation/demodulation unit 293 may be used as a means for controlling a current and/or voltage flowing through the power conversion unit 111 of the wireless power transmission apparatus 100. Hereinafter, a method for allowing the power communications modulation/demodulation units 113 and 293 of the wireless power transmission apparatus 100 and the wireless power reception apparatus 200, respectively, to be used to transmit and receive a power control message through a wireless power signal will be described.

The wireless power signal generated by the power conversion unit 111 is received by the power reception unit 291. At this time, the power reception control unit 292 controls the modulation/demodulation unit 293 of the wireless power reception apparatus 200 to modulate the wireless power signal. For instance, the power reception control unit 292 may perform a modulation process such that an amount of power received from the wireless power signal is varied by changing reactance of the power communications modulation/demodulation unit 293 connected to the power reception unit 291. A change of an amount of power received from the wireless power signal results in a change of a current and/or voltage of the power conversion unit 111 for generating the wireless power signal. At this time, the modulation/demodulation unit 113 of the wireless power transmission apparatus 100 may detect the change of the current and/or voltage to perform a demodulation process.

In other words, the power reception control unit 292 may generate a packet including a power control message intended to be transmitted to the wireless power transmission apparatus 100 and modulate the wireless power signal to include the packet, and the power transmission control unit 112 may decode the packet based on the demodulation result, thereby acquiring the power control message included in the packet.

In addition, in some exemplary embodiments, the power reception control unit 292 may transmit the power control message to the wireless power transmission apparatus 100 by transmitting user data including the power control message through a communication device (not shown) included in the wireless power reception apparatus 200.

[In Case of Supporting In-Band Two-Way Communication]

In addition, in a wireless power transmission environment capable of bidirectional communication according to the embodiments disclosed herein, the power reception control unit 292 may receive data transmitted from the wireless power transmission apparatus 100. The data transmitted from the wireless power transmission apparatus 100 may be transmitted to request for transmission of a power control message.

In addition, the power supply unit 290 may further include a charger 298 and a battery 299.

The wireless power reception apparatus 200 receiving power for operation from the power supply unit 290 may be operated by power transmitted from the wireless power transmission apparatus 100, or operated by charging the battery 299 using the transmitted power and then receiving the charged power. At this time, the power reception control unit 292 may control the charger 298 to perform charging using the transmitted power.

Hereinafter, description will be given of a wireless power transmission apparatus and a wireless power reception apparatus applicable to embodiments disclosed herein. First, a method of allowing the wireless power transmission apparatus to transmit power to the electronic device according to the inductive coupling method will be described with reference to FIGS. 3 to 5.

Inductive Coupling Method

Figure 3:
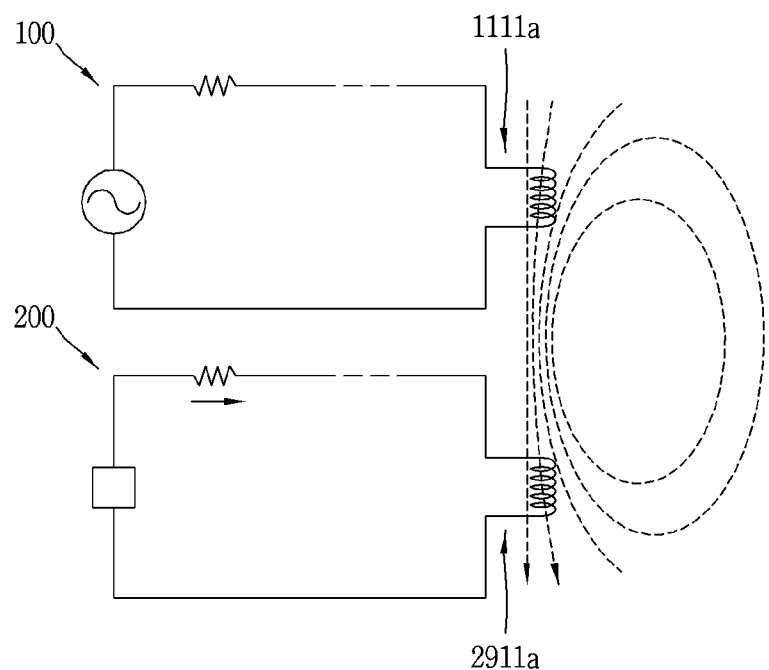
FIG. 3 is a view illustrating a concept in which power is transmitted from a wireless power transmission apparatus to a wireless power reception apparatus in a wireless manner according to an inductive coupling method.

FIG. 3 is a view illustrating a concept in which power is transmitted from a wireless power transmission apparatus to a wireless power reception apparatus in a wireless manner according to an inductive coupling method.

When the power of the wireless power transmission apparatus 100 is transmitted in an inductive coupling method, if the strength of a current flowing through a primary coil within the power transmission unit 110 is changed, then a magnetic field passing through the primary coil will be changed by the current. The changed magnetic field generates an induced electromotive force at a secondary coil in the wireless power reception apparatus 200.

According to the foregoing method, the power conversion unit 111 of the wireless power transmission apparatus 100 may include a transmission (Tx) coil 1111a being operated as a primary coil in magnetic induction. Furthermore, the power reception unit 291 of the wireless power reception apparatus 200 may include a reception (Rx) coil 2911a being operated as a secondary coil in magnetic induction.

First, the wireless power transmission apparatus 100 and wireless power reception apparatus 200 are disposed in such a manner that the transmission coil 1111a at the side of the wireless power transmission apparatus 100 and the reception coil at the side of the wireless power reception apparatus 200 are located adjacent to each other. Then, if the power transmission control unit 112 controls a current of the transmission (Tx) coil 1111a to be changed, then the power reception unit 291 controls power to be supplied to the wireless power reception apparatus 200 using an electromotive force induced to the reception (Rx) coil 2911a.

The efficiency of wireless power transmission by the inductive coupling method may be little affected by a frequency characteristic, but affected by an alignment and distance between the wireless power transmission apparatus 100 and the wireless power reception apparatus 200 including each coil.

On the other hand, in order to perform wireless power transmission in the inductive coupling method, the wireless power transmission apparatus 100 may be configured to include an interface surface (not shown) in the form of a flat surface. One or more electronic devices may be placed at an upper portion of the interface surface, and the transmission coil 1111a may be mounted at a lower portion of the interface surface. In this case, a vertical spacing is formed in a small-scale between the transmission coil 1111a mounted at a lower portion of the interface surface and the reception coil 2911a of the wireless power reception apparatus 200 placed at an upper portion of the interface surface, and thus a distance between the coils becomes sufficiently small to efficiently implement wireless power transmission by the inductive coupling method.

Furthermore, an alignment indicator (not shown) indicating a location where the wireless power reception apparatus 200 is to be placed at an upper portion of the interface surface. The alignment indicator indicates a location of the wireless power reception apparatus 200 where an alignment between the transmission coil 1111a mounted at a lower portion of the interface surface and the reception coil 2911a can be suitably implemented. The alignment indicator may alternatively be simple marks, or may be formed in the form of a protrusion structure for guiding the location of the wireless power reception apparatus 200. Otherwise, the alignment indicator may be formed in the form of a magnetic body such as a magnet mounted at a lower portion of the interface surface, thereby guiding the coils to be suitably arranged by mutual magnetism to a magnetic body having an opposite polarity mounted within the wireless power reception apparatus 200.

On the other hand, the wireless power transmission apparatus 100 may be formed to include one or more transmission coils. The wireless power transmission apparatus 100 may selectively use some of coils suitably arranged with the reception coil 2911a of the wireless power reception apparatus 200 among the one or more transmission coils to enhance the power transmission efficiency. The wireless power transmission apparatus 100 including the one or more transmission coils will be described later with reference to FIG. 5.

Hereinafter, configurations of the wireless power transmission apparatus and electronic device using an inductive coupling method applicable to the embodiments disclosed herein will be described in detail.

Figure 4A:
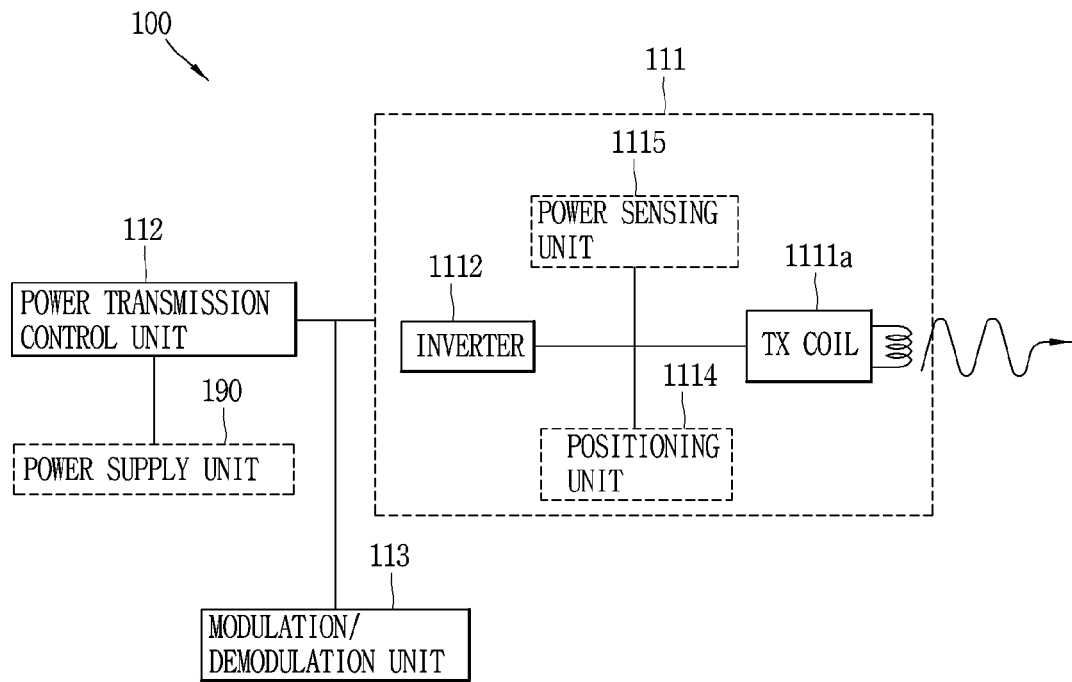
FIGS. 4A and 4B are block diagrams exemplarily showing part of the configuration of the wireless power transmission apparatus and wireless power reception apparatus in a magnetic induction method that can be employed in embodiments disclosed herein.
Figure 4B:
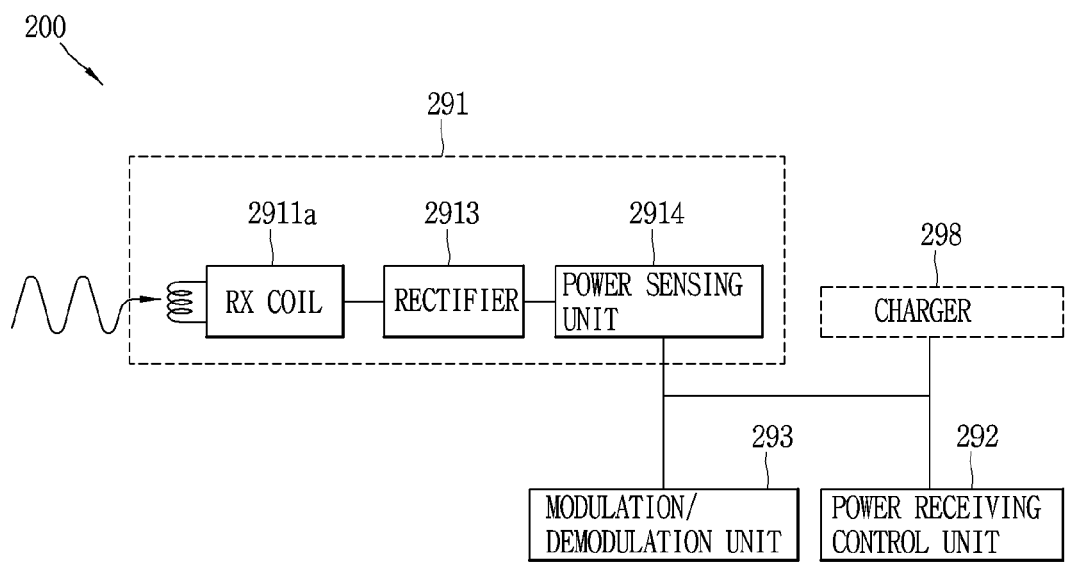

Wireless Power Transmission Apparatus and Wireless Power Reception Apparatus in Inductive Coupling Method FIGS. 4A and 4B are block diagrams illustrating part of the configuration the wireless power transmission apparatus 100 and wireless power reception apparatus 200 in a magnetic induction method that can be employed in the embodiments disclosed herein. A configuration of the power transmission unit 110 included in the wireless power transmission apparatus 100 will be described with reference to FIG. 4A, and a configuration of the power supply unit 290 included in the wireless power reception apparatus 200 will be described with reference to FIG. 4B.

Referring to FIG. 4A, the power conversion unit 111 of the wireless power transmission apparatus 100 may include a transmission (Tx) coil 1111a and an inverter 1112.

The transmission coil 1111a may form a magnetic field corresponding to the wireless power signal according to a change of current as described above. The transmission coil 1111a may alternatively be implemented with a planar spiral type or cylindrical solenoid type.

The inverter 1112 transforms a DC input obtained from the power supply unit 190 into an AC waveform. The AC current transformed by the inverter 1112 drives a resonant circuit including the transmission coil 1111a and a capacitor (not shown) to form a magnetic field in the transmission coil 1111a.

In addition, the power conversion unit 111 may further include a positioning unit 1114.

The positioning unit 1114 may move or rotate the transmission coil 1111a to enhance the effectiveness of wireless power transmission using the inductive coupling method. As described above, it is because an alignment and distance between the wireless power transmission apparatus 100 and the wireless power reception apparatus 200 including a primary coil and a secondary coil may affect power transmission using the inductive coupling method. In particular, the positioning unit 1114 may be used when the wireless power reception apparatus 200 is not present within an active area of the wireless power transmission apparatus 100.

Accordingly, the positioning unit 1114 may include a drive unit (not shown) for moving the transmission coil 1111a such that a center-to-center distance of the transmission coil 1111a of the wireless power transmission apparatus 100 and the reception coil 2911a of the wireless power reception apparatus 200 is within a predetermined range, or rotating the transmission coil 1111a such that the centers of the transmission coil 1111a and the reception coil 2911a are overlapped with each other.

For this purpose, the wireless power transmission apparatus 100 may further include a detection unit (not shown) made of a sensor for detecting the location of the wireless power reception apparatus 200, and the power transmission control unit 112 may control the positioning unit 1114 based on the location information of the wireless power reception apparatus 200 received from the location detection sensor.

Furthermore, to this end, the power transmission control unit 112 may receive control information on an alignment or distance to the wireless power reception apparatus 200 through the power communications modulation/demodulation unit 113, and control the positioning unit 1114 based on the received control information on the alignment or distance.

If the power conversion unit 111 is configured to include a plurality of transmission coils, then the positioning unit 1114 may determine which one of the plurality of transmission coils is to be used for power transmission. The configuration of the wireless power transmission apparatus 100 including the plurality of transmission coils will be described later with reference to FIG. 5.

On the other hand, the power conversion unit 111 may further include a power sensing unit 1115. The power sensing unit 1115 at the side of the wireless power transmission apparatus 100 monitors a current or voltage flowing into the transmission coil 1111a. The power sensing unit 1115 is provided to check whether or not the wireless power transmission apparatus 100 is normally operated, and thus the power sensing unit 1115 may detect a voltage or current of the power supplied from the outside, and check whether the detected voltage or current exceeds a threshold value. The power sensing unit 1115, although not shown, may include a resistor for detecting a voltage or current of the power supplied from the outside and a comparator for comparing a voltage value or current value of the detected power with a threshold value to output the comparison result. Based on the check result of the power sensing unit 1115, the power transmission control unit 112 may control a switching unit (not shown) to cut off power applied to the transmission coil 1111a.

Referring to FIG. 4B, the power supply unit 290 of the wireless power reception apparatus 200 may include a reception (Rx) coil 2911a and a rectifier 2913.

A current is induced into the reception coil 2911a by a change of the magnetic field formed in the transmission coil 1111a. The implementation type of the reception coil 2911a may be a planar spiral type or cylindrical solenoid type similarly to the transmission coil 1111a.

Furthermore, series and parallel capacitors may be configured to be connected to the reception coil 2911a to enhance the effectiveness of wireless power reception or perform resonant detection.

The reception coil 2911a may be in the form of a single coil or a plurality of coils.

The rectifier 2913 performs a full-wave rectification to a current to convert alternating current into direct current. The rectifier 2913, for instance, may be implemented with a full-bridge rectifier made of four diodes or a circuit using active components.

In addition, the rectifier 2913 may further include a regulator for converting a rectified current into a more flat and stable direct current. Furthermore, the output power of the rectifier 2913 is supplied to each constituent element of the power supply unit 290. Furthermore, the rectifier 2913 may further include a DC-DC converter for converting output DC power into a suitable voltage to adjust it to the power required for each constituent element (for instance, a circuit such as a charger 298).

The power communications modulation/demodulation unit 293 may be connected to the power reception unit 291, and may be configured with a resistive element in which resistance varies with respect to direct current, and may be configured with a capacitive element in which reactance varies with respect to alternating current. The power reception control unit 292 may change the resistance or reactance of the power communications modulation/demodulation unit 293 to modulate a wireless power signal received to the power reception unit 291.

On the other hand, the power supply unit 290 may further include a power sensing unit 2914. The power sensing unit 2914 at the side of the wireless power reception apparatus 200 monitors a voltage and/or current of the power rectified by the rectifier 2913, and if the voltage and/or current of the rectified power exceeds a threshold value as a result of monitoring, then the power reception control unit 292 transmits a power control message to the wireless power transmission apparatus 100 to transmit suitable power.

Figure 5:
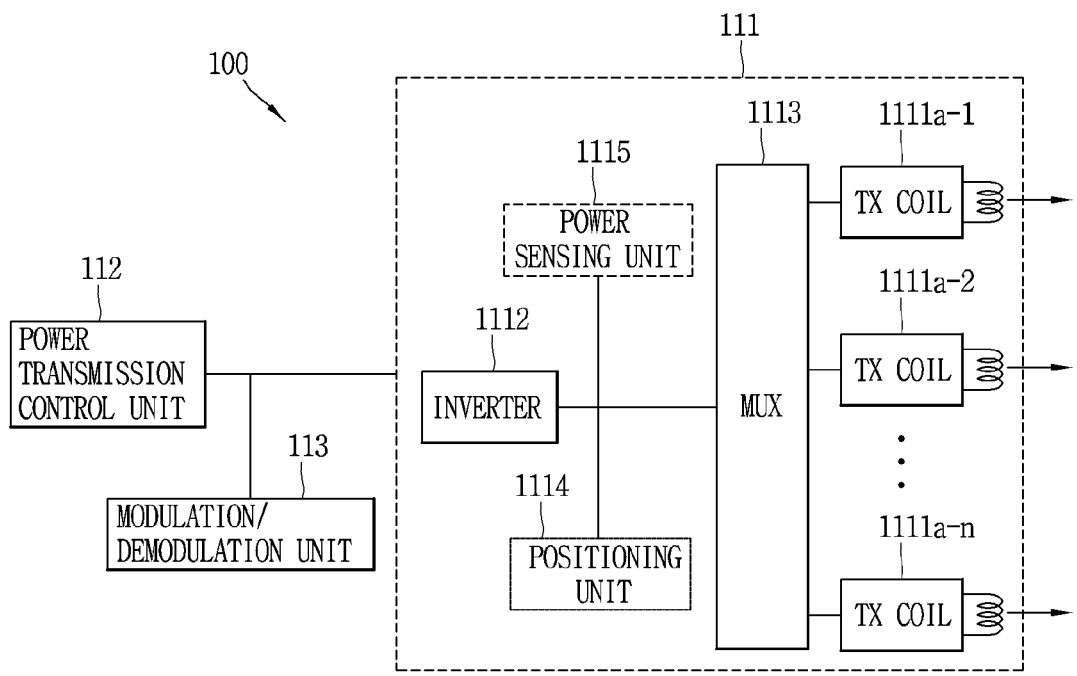
FIG. 5 is a block diagram illustrating a wireless power transmission apparatus configured to have one or more transmission coils receiving power according to an inductive coupling method that can be employed in embodiments disclosed herein.

Wireless Power Transmission Apparatus Configured to Include One or More Transmission Coils FIG. 5 is a block diagram illustrating a wireless power transmission apparatus configured to have one or more transmission coils receiving power according to an inductive coupling method that can be employed in embodiments disclosed herein.

Referring to FIG. 5, the power conversion unit 111 of the wireless power transmission apparatus 100 according to embodiments disclosed herein may include one or more transmission coils 1111a-1 to 1111a-n. The one or more transmission coils 1111a-1 to 1111a-n may be an array of partially overlapping primary coils. An active area may be determined by some of the one or more transmission coils.

The one or more transmission coils 1111a-1 to 1111a-n may be mounted at a lower portion of the interface surface.

Furthermore, the power conversion unit 111 may further include a multiplexer 1113 for establishing and releasing the connection of some of the one or more transmission coils 1111a-1 to 1111a-n.

Upon detecting the location of the wireless power reception apparatus 200 placed at an upper portion of the interface surface, the power transmission control unit 112 may take the detected location of the wireless power reception apparatus 200 into consideration to control the multiplexer 1113, thereby allowing coils that can be placed in an inductive coupling relation to the reception coil 2911a of the wireless power reception apparatus 200 among the one or more transmission coils 1111a-1 to 1111a-n to be connected to one another.

For this purpose, the power transmission control unit 112 may acquire the location information of the wireless power reception apparatus 200. For example, the power transmission control unit 112 may acquire the location of the wireless power reception apparatus 200 on the interface surface by the location detection unit (not shown) provided in the wireless power transmission apparatus 100. For another example, the power transmission control unit 112 may alternatively receive a power control message indicating a strength of the wireless power signal from an object on the interface surface or a power control message indicating the identification information of the object using the one or more transmission coils 1111a-1 to 1111a-n, respectively, and determines whether it is located adjacent to which one of the one or more transmission coils based on the received result, thereby acquiring the location information of the wireless power reception apparatus 200.

On the other hand, the active area as part of the interface surface may denote a portion through which a magnetic field with a high efficiency can pass when the wireless power transmission apparatus 100 transmits power to the wireless power reception apparatus 200 in a wireless manner. At this time, a single transmission coil or one or a combination of more transmission coils forming a magnetic field passing through the active area may be designated as a primary cell. Accordingly, the power transmission control unit 112 may determine an active area based on the detected location of the wireless power reception apparatus 200, and establish the connection of a primary cell corresponding to the active area to control the multiplexer 1113, thereby allowing the reception coil 2911a of the wireless power reception apparatus 200 and the coils belonging to the primary cell to be placed in an inductive coupling relation.

Furthermore, the power conversion unit 111 may further include an impedance matching unit (not shown) for controlling an impedance to form a resonant circuit with the coils connected thereto.

Hereinafter, a method for allowing a wireless power transmission apparatus to transmit power according to a resonance coupling method will be disclosed with reference to FIGS. 6 to 8.

Resonance Coupling Method

Figure 6:
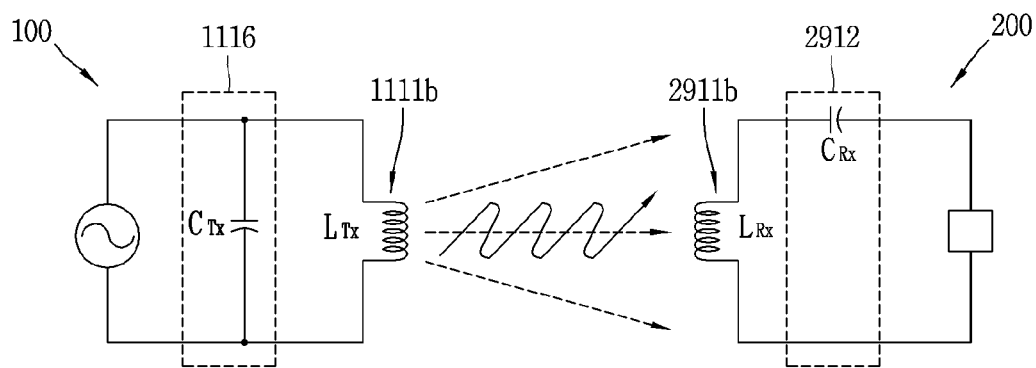
FIG. 6 is a view illustrating a concept in which power is transmitted to a wireless power reception apparatus from a wireless power transmission apparatus in a wireless manner according to a resonance coupling method.

FIG. 6 is a view illustrating a concept in which power is transmitted to a wireless power reception apparatus from a wireless power transmission apparatus in a wireless manner according to a resonance coupling method.

First, resonance will be described in brief as follows. Resonance refers to a phenomenon in which amplitude of vibration is remarkably increased when periodically receiving an external force having the same frequency as the natural frequency of a vibration system. Resonance is a phenomenon occurring at all kinds of vibrations such as mechanical vibration, electric vibration, and the like. Generally, when exerting a vibratory force to a vibration system from the outside, if the natural frequency thereof is the same as a frequency of the externally applied force, then the vibration becomes strong, thus increasing the width.

With the same principle, when a plurality of vibrating bodies separated from one another within a predetermined distance vibrate at the same frequency, the plurality of vibrating bodies resonate with one another, and in this case, resulting in a reduced resistance between the plurality of vibrating bodies. In an electrical circuit, a resonant circuit can be made by using an inductor and a capacitor.

When the wireless power transmission apparatus 100 transmits power according to the inductive coupling method, a magnetic field having a specific vibration frequency is formed by alternating current power in the power transmission unit 110. If a resonance phenomenon occurs in the wireless power reception apparatus 200 by the formed magnetic field, then power is generated by the resonance phenomenon in the wireless power reception apparatus 200.

The resonant frequency may be determined by the following formula in Equation 1.

$$f = \frac{1}{2\pi\sqrt{LC}} \qquad \text{[Equation 1]}$$

Here, the resonant frequency f is determined by an inductance L and a capacitance C in a circuit. In a circuit forming a magnetic field using a coil, the inductance may be determined by a number of turns of the coil, and the like, and the capacitance may be determined by a distance, an area, and the like between the coils. In addition to the coil, a capacitive resonant circuit may be configured to be connected thereto to determine the resonant frequency.

Referring to FIG. 6, when power is transmitted in a wireless manner according to the resonance coupling method, the power conversion unit 111 of the wireless power transmission apparatus 100 may include a transmission (Tx) coil 1111b in which a magnetic field is formed and a resonant circuit 1116 connected to the transmission coil 1111b to determine a specific vibration frequency. The resonant circuit 1116 may be implemented by using a capacitive circuit (capacitors), and the specific vibration frequency may be determined based on an inductance of the transmission coil 1111b and a capacitance of the resonant circuit 1116.

The configuration of a circuit element of the resonant circuit 1116 may be implemented in various forms such that the power conversion unit 111 forms a magnetic field, and is not limited to a form of being connected in parallel to the transmission coil 1111b as illustrated in FIG. 6.

Furthermore, the power reception unit 291 of the wireless power reception apparatus 200 may include a resonant circuit 2912 and a reception (Rx) coil 2911b to generate a resonance phenomenon by a magnetic field formed in the wireless power transmission apparatus 100. In other words, the resonant circuit 2912 may be also implemented by using a capacitive circuit, and the resonant circuit 2912 is configured such that a resonant frequency determined based on an inductance of the reception coil 2911b and a capacitance of the resonant circuit 2912 has the same frequency as a resonant frequency of the formed magnetic field.

The configuration of a circuit element of the resonant circuit 2912 may be implemented in various forms such that the power reception unit 291 generates resonance by a magnetic field, and is not limited to a form of being connected in series to the reception coil 2911b as illustrated in FIG. 6.

The specific vibration frequency in the wireless power transmission apparatus 100 may have LTX, CTX, and may be acquired by using the Equation 1. Here, the wireless power reception apparatus 200 generates resonance when a result of substituting the LRX and CRX of the wireless power reception apparatus 200 to the Equation 1 is same as the specific vibration frequency.

According to a wireless power transmission method due to resonance coupling, since electromagnetic waves are transmitted through a short-range electromagnetic field when the wireless power transmission apparatus 100 and the wireless power reception apparatus 200 resonate at the same frequency, there is no transmission of energy between the devices.

Therefore, an efficiency of wireless power transmission by the resonance coupling method is greatly affected by a frequency characteristic, whereas the effect of an alignment and distance between the wireless power transmission apparatus 100 and the wireless power reception apparatus 200 including each coil is relatively smaller than the inductive coupling method.

Hereinafter, the configuration of a wireless power transmission apparatus and an electronic device in the resonance coupling method applicable to the embodiments disclosed herein will be described in detail.

Wireless Power Transmission Apparatus in Resonance Coupling Method

FIG. 7 is a block diagram illustrating part of the configuration of the wireless power transmission apparatus 100 and the wireless power reception apparatus 200 in a resonance method that can be employed in embodiments disclosed herein.

Figure 7A:
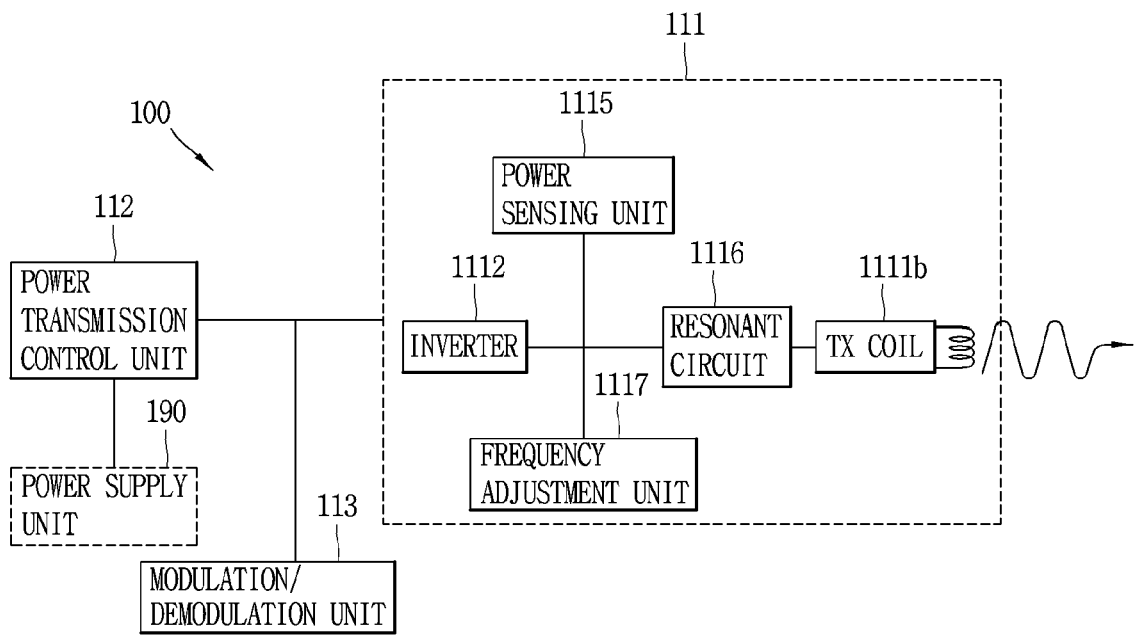
FIGS. 7A and 7B are block diagrams showing part of the configuration of the wireless power transmission apparatus and wireless power reception apparatus in a resonance method that can be employed in embodiments disclosed herein.

A configuration of the power transmission unit 110 included in the wireless power transmission apparatus 100 will be described with reference to FIG. 7A.

The power conversion unit 111 of the wireless power transmission apparatus 100 may include a transmission (Tx) coil 1111b, an inverter 1112, and a resonant circuit 1116. The inverter 1112 may be configured to be connected to the transmission coil 1111b and the resonant circuit 1116.

The transmission coil 1111b may be mounted separately from the transmission coil 1111a for transmitting power according to the inductive coupling method, but may transmit power in the inductive coupling method and resonance coupling method using one single coil.

The transmission coil 1111b, as described above, forms a magnetic field for transmitting power. The transmission coil 1111b and the resonant circuit 1116 generate resonance when alternating current power is applied thereto, and at this time, a vibration frequency may be determined based on an inductance of the transmission coil 1111b and a capacitance of the resonant circuit 1116.

For this purpose, the inverter 1112 transforms a DC input obtained from the power supply unit 190 into an AC waveform, and the transformed AC current is applied to the transmission coil 1111b and the resonant circuit 1116.

In addition, the power conversion unit 111 may further include a frequency adjustment unit 1117 for changing a resonant frequency of the power conversion unit 111. The resonant frequency of the power conversion unit 111 is determined based on an inductance and/or capacitance within a circuit constituting the power conversion unit 111 by Equation 1, and thus the power transmission control unit 112 may determine the resonant frequency of the power conversion unit 111 by controlling the frequency adjustment unit 1117 to change the inductance and/or capacitance.

The frequency adjustment unit 1117, for example, may be configured to include a motor for adjusting a distance between capacitors included in the resonant circuit 1116 to change a capacitance, or include a motor for adjusting a number of turns or diameter of the transmission coil 1111b to change an inductance, or include active elements for determining the capacitance and/or inductance On the other hand, the power conversion unit 111 may further include a power sensing unit 1115. The operation of the power sensing unit 1115 is the same as the foregoing description.

Figure 7B:
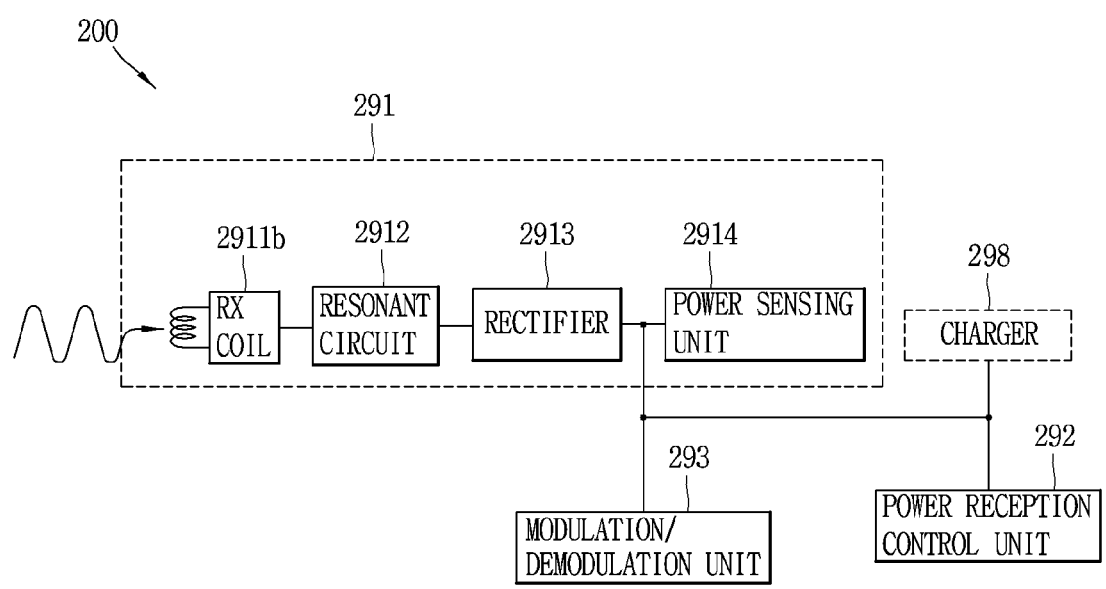

Referring to FIG. 7B, a configuration of the power supply unit 290 included in the wireless power reception apparatus 200 will be described. The power supply unit 290, as described above, may include the reception (Rx) coil 2911b and resonant circuit 2912.

In addition, the power reception unit 291 of the power supply unit 290 may further include a rectifier 2913 for converting an AC current generated by resonance phenomenon into DC. The rectifier 2913 may be configured similarly to the foregoing description.

Furthermore, the power reception unit 291 may further include a power sensing unit 2914 for monitoring a voltage and/or current of the rectified power. The power sensing unit 2914 may be configured similarly to the foregoing description.

Figure 8:
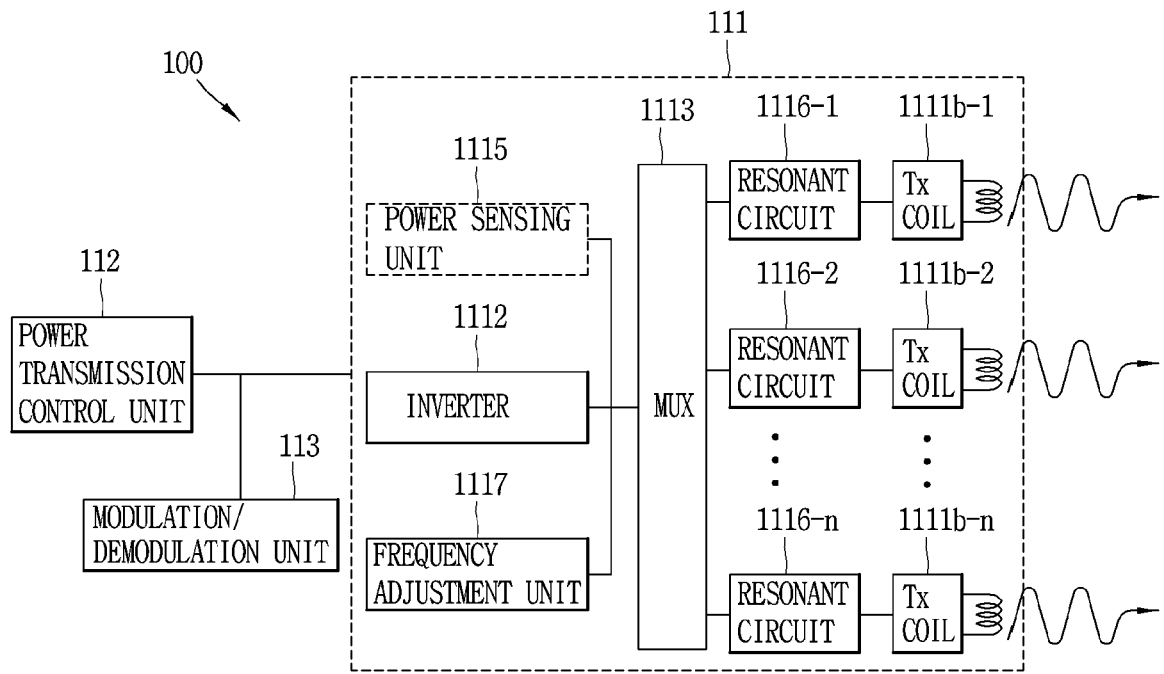
FIG. 8 is a block diagram illustrating a wireless power transmission apparatus configured to have one or more transmission coils receiving power according to a resonance coupling method that can be employed in embodiments disclosed herein.

Wireless Power Transmission Apparatus Configured to Include One or More Transmission Coils FIG. 8 is a block diagram illustrating a wireless power transmission apparatus configured to have one or more transmission coils receiving power according to a resonance coupling method that can be employed in embodiments disclosed herein.

Referring to FIG. 8, the power conversion unit 111 of the wireless power transmission apparatus 100 according to the embodiments disclosed herein may include one or more transmission coils 1111b-1 to 1111b-n and resonant circuits 1116-1 to 1116-n connected to each transmission coils. Furthermore, the power conversion unit 111 may further include a multiplexer 1113 for establishing and releasing the connection of some of the one or more transmission coils 1111b-1 to 1111b-n.

The one or more transmission coils 1111b-1 to 1111b-n may be configured to have the same vibration frequency, or some of them may be configured to have different vibration frequencies. It is determined by an inductance and/or capacitance of the resonant circuits 1116-1 to 1116-n connected to the one or more transmission coils 1111b-1 to 1111b-n, respectively.

For this purpose, the frequency adjustment unit 1117 may be configured to change an inductance and/or capacitance of the resonant circuits 1116-1 to 1116-n connected to the one or more transmission coils 1111b-1 to 1111b-n, respectively.

In-Band Communication

Figure 9:
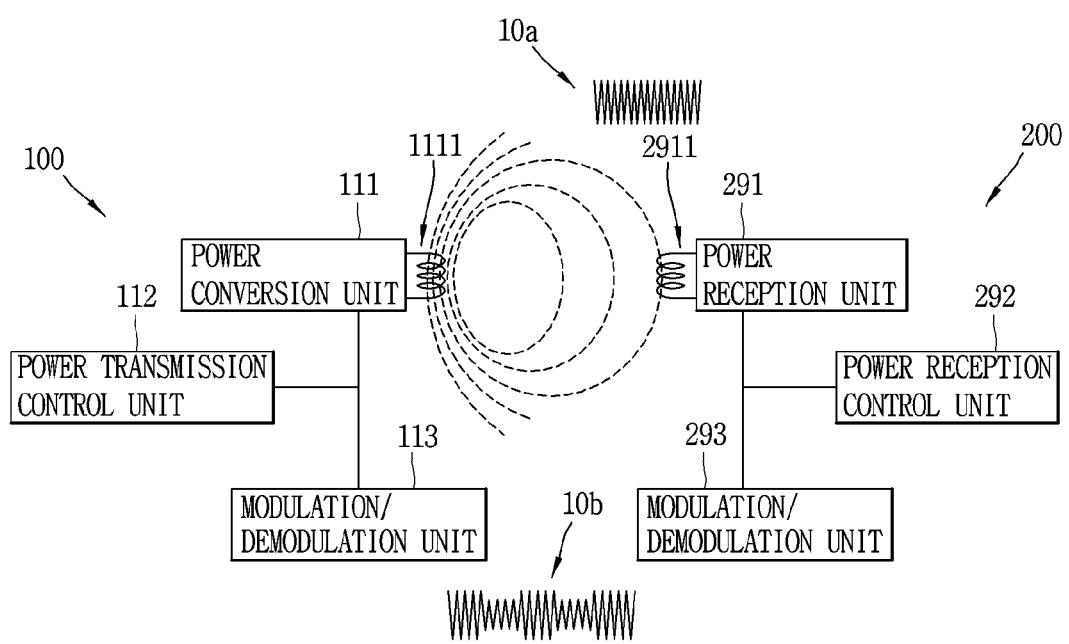
FIG. 9 a view illustrating a concept of transmitting and receiving a packet between a wireless power transmission apparatus and an electronic device through the modulation and demodulation of a wireless power signal in wireless power transmission according to embodiments disclosed herein.

FIG. 9 a view illustrating a concept of transmitting and receiving a packet between a wireless power transmission apparatus and an electronic device through the modulation and demodulation of a wireless power signal in wireless power transmission according to embodiments disclosed herein.

Referring to FIG. 9, the power conversion unit 111 included in the wireless power transmission apparatus 100 may generate a wireless power signal. The wireless power signal may be generated through the transmission coil 1111 included in the power conversion unit 111.

The wireless power signal 10a generated by the power conversion unit 111 may arrive at the electronic device 200 so as to be received through the power reception unit 291 of the electronic device 200. The generated wireless power signal may be received through the reception coil 2911 included in the power reception unit 291.

The power reception control unit 292 may control the modulation/demodulation unit 293 connected to the power reception unit 291 to modulate the wireless power signal while the electronic device 200 receives the wireless power signal. When the received wireless power signal is modulated, the wireless power signal may form a closed-loop within a magnetic field or an electro-magnetic field. This may allow the wireless power transmission apparatus 100 to sense a modulated wireless power signal 10b. The modulation/demodulation unit 113 may demodulate the sensed wireless power signal and decode the packet from the demodulated wireless power signal.

The modulation method employed for communication between the wireless power transmission apparatus 100 and the electronic device 200 may be an amplitude modulation. As described above, the amplitude modulation method may be a backscatter modulation method in which the modulation/demodulation unit 293 at a side of the electronic device 200 changes an amplitude of the wireless power signal 10a formed by the power conversion unit 111 to allow the modulation/demodulation unit 293 at a side of the wireless power transmission apparatus 100 to detect an amplitude of the modulated wireless power signal 10b.

Modulation and Demodulation of Wireless Power Signal

Hereinafter, description will be given of modulation and demodulation of a packet, which is transmitted or received between the wireless power transmission apparatus 100 and the electronic device 200 with reference to FIGS. 10 and 11.

Figure 10:
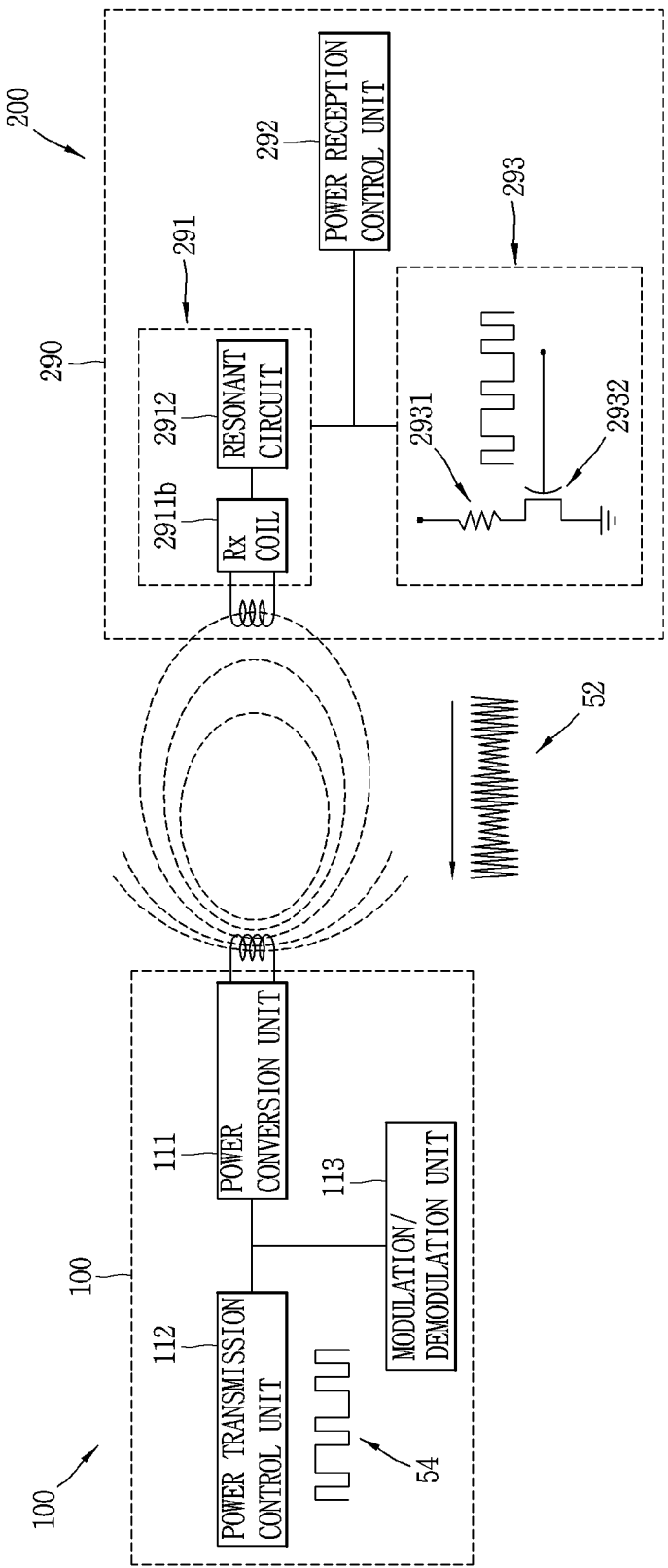
FIG. 10 is a view illustrating a configuration of transmitting and receiving a power control message in wireless power transmission according to embodiments disclosed herein.

FIG. 10 is a view illustrating a configuration of transmitting and receiving a power control message in wireless power transmission according to embodiments disclosed herein. FIG. 11 illustrates a signal form in modulation and demodulation performed in wireless power transmission according to embodiments disclosed herein.

Figure 11:
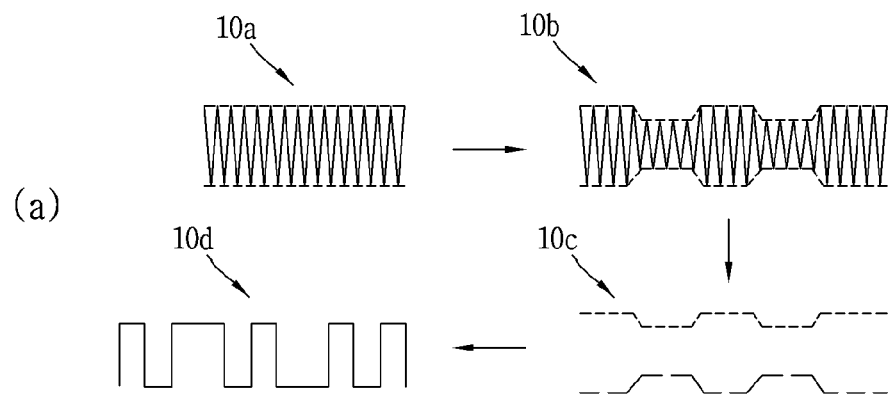
FIG. 11 illustrates a signal form in modulation and demodulation performed in wireless power transmission according to embodiments disclosed herein.
Figure 11:
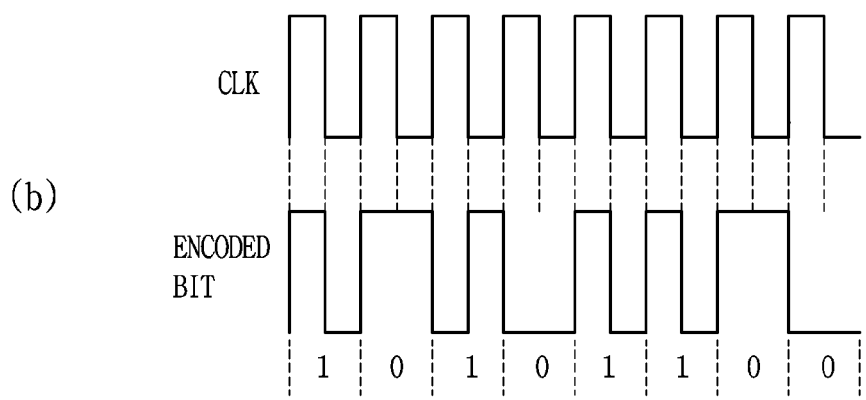
Figure 11:
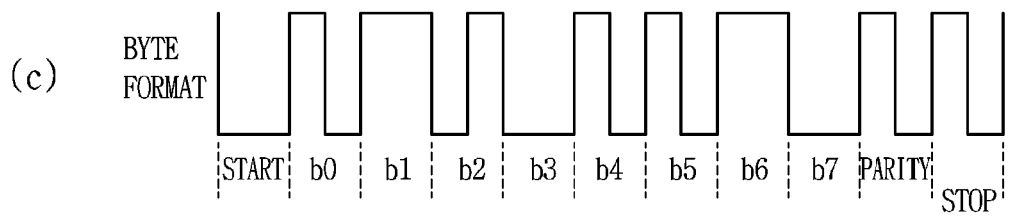

Referring to FIG. 10, a wireless power signal received through the power reception unit 291 of the electronic device 200 is an unmodulated wireless power signal 51 as illustrated in (a) of FIG. 11. Resonant coupling is made between the electronic device 200 and the wireless power transmission apparatus 100 according to a resonant frequency set by the resonant circuit 2912 in the power reception unit 291, and the wireless power signal 51 is received through the reception coil 2911b.

The power reception control unit 292 may modulate the wireless power signal 51 received through the power reception unit 291 by changing a load impedance within the modulation/demodulation unit 293. The modulation/demodulation unit 293 may include a passive element 2931 and an active element 2932 for modulating the wireless power signal 51. The modulation/demodulation unit 293 may modulate the wireless power signal 51 to include a packet desired to be transmitted to the wireless power transmission apparatus 100. Here, the packet may be input into the active element 2932 within the modulation/demodulation unit 293.

Then, the power transmission control unit 112 of the wireless power transmission apparatus 100 may demodulate a modulated wireless power signal 52 through an envelope detection process, and decode the detected signal 53 into digital data 54. The demodulation may detect a current or voltage flowing into the power conversion unit 111 to be classified into two states, a HI state and a LO state, and acquire a packet desired to be transmitted by the electronic device 200 based on digital data classified according to the states.

Hereinafter, a process of allowing the wireless power transmission apparatus 100 to acquire a power control message desired to be transmitted by the electronic device 200 from the demodulated digital data will be described.

Referring to (b) of FIG. 11, the power transmission control unit 112 detects an encoded bit using a clock signal CLK from the detected envelope signal. The detected encoded bit is encoded according to a bit encoding method used in the modulation process at the side of the electronic device 200. In some embodiments, the bit encoding method may be non-return to zero (NRZ). In some embodiments, the bit encoding method may be bi-phase encoding.

For instance, the detected bit may be a differential bi-phase (DBP) encoded bit. According to the DBP encoding, the power reception control unit 292 at the side of the electronic device 200 is allowed to have two state transitions to encode data bit 1, and to have one state transition to encode data bit 0. In other words, data bit 1 may be encoded in such a manner that a transition between the HI state and the LO state is generated at a rising edge and falling edge of the clock signal, and data bit 0 may be encoded in such a manner that a transition between the HI state and the LO state is generated at a rising edge of the clock signal.

On the other hand, the power transmission control unit 112 may acquire data in a byte unit using a byte format constituting a packet from a bit string detected according to the bit encoding method. In some embodiments, the detected bit string may be transmitted using an 11-bit asynchronous serial format as illustrated in (c) of FIG. 12. In other words, the detected bit may include a start bit indicating the beginning of a byte and a stop bit indicating the end of a byte, and also include data bits (b0 to b7) between the start bit and the stop bit. Furthermore, it may further include a parity bit for checking an error of data. The data in a byte unit constitutes a packet including a power control message.

[In Case of Supporting In-band Two-way Communication]

As described above, FIG. 9 illustrates a view in which the wireless power reception apparatus 200 transmits a packet using a carrier signal 10a formed by the wireless power transmission apparatus 100, but the wireless power transmission apparatus 100 may also transmit data to the wireless power reception apparatus 200 in a similar manner as above.

That is, the power transmission control unit 112 may control the modulation/demodulation unit 113 to modulate data, which is to be transmitted to the wireless power reception apparatus 200, such that the data can be included in the carrier signal 10a. Here, the power reception control unit 292 of the wireless power reception apparatus 200 may control the modulation/demodulation unit 293 to execute demodulation so as to acquire data from the modulated carrier signal 10a.

Hereinafter, a wireless power transmission apparatus having a multi-array coil for EMI/EMF improvement according to the present specification will be described. In recent years, it is required to expand a degree of positional freedom of wireless charging of electronic devices including a user's mobile terminal. In addition, there is a need for multi-charging for simultaneously charging two or more electronic devices. Accordingly, demand for single or multiple charging is growing in a wider active area, that is, a wireless charging area, even in households and automobile OEMs.

As a powerful element for realizing a wide active area and multiple charging, a transmission coil of a wireless power transmission apparatus may be configured with a multi-array coil.

In addition, transmission power tends to increase in line with the fast-charging trend of a home smart phone wireless charger. In addition, a smart phone wireless charger in a vehicle is also expected to increase transmission power correspondingly. Such an increase in transmission power provides the user with the convenience of rapid charging. However, a problem may occur in which electro-magnetic interference (EMI) to other electronic devices increases due to an increase in leakage magnetic field strength. In addition, there may be a problem that the effect of exposure of a human body to electromagnetic waves (electro-magnetic field, EMF) increases due to the increase in the leakage magnetic field strength.

Figure 12A:
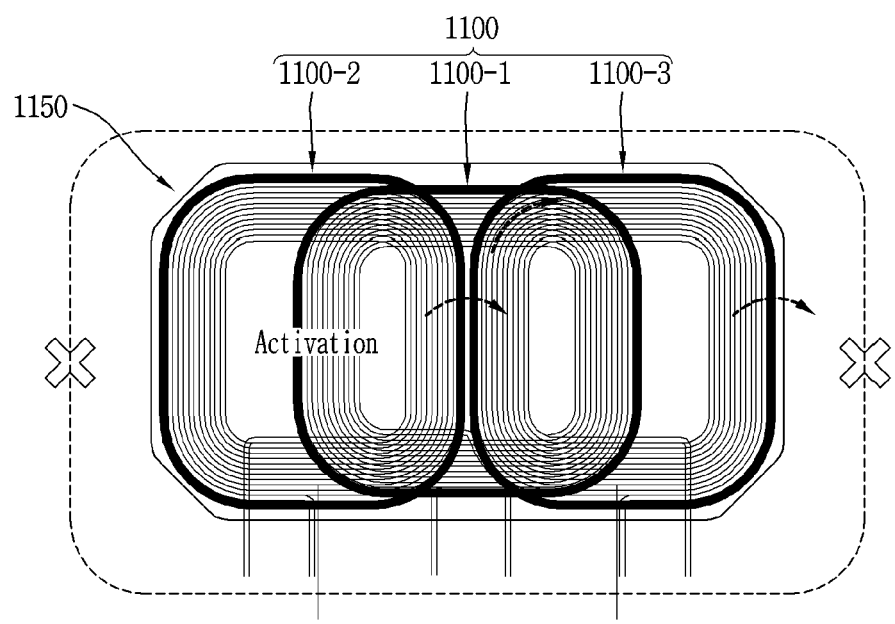
FIG. 12A shows a configuration of a wireless power transmission apparatus having a multi-array coil for EMI/EMF improvement according to an embodiment of the present specification.
Figure 12B:
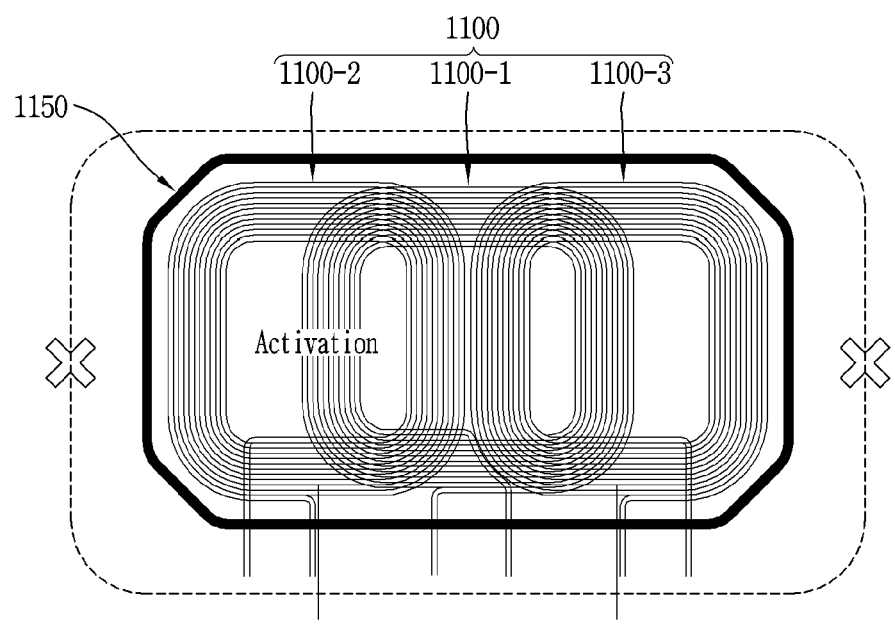
FIG. 12B shows a configuration of a wireless power transmission apparatus having a multi-array coil for EMI/EMF improvement according to another embodiment of the present specification.

In this specification, a shielding method for improving EMI/EMF of a wireless charging system employing a multi-array coil is proposed. In this regard, FIG. 12A shows a configuration of a wireless power transmission apparatus having a multi-array coil for EMI/EMF improvement according to an embodiment of the present specification. FIG. 12B shows a configuration of a wireless power transmission apparatus having a multi-array coil for EMI/EMF improvement according to another embodiment of the present specification.

Referring to FIGS. 12A and 12B, an MP-A6 model may be a model in which only one coil having the largest coupling coefficient among three coils operates according to the location of the reception unit, but the present disclosure is not limited thereto and may also be applied to another model such as MP-A10.

FIG. 12A shows a structure in which a shielding coil is applied to each coil, wherein an additional circuit that opens a shielding coil for a currently non-operating coil in the same manner is required. In this regard, when a shielding coil for a non-operating coil is not opened, an induced electromotive force may be induced in the shielding coil, which may cause an adverse effect of increasing a leakage field. In FIG. 12A, when a first lower coil 1100-2 is activated, a current of the first lower coil 1100-2 is coupled to an upper coil 1100-1. Furthermore, a current of the upper coil 1100-1 is coupled to a second lower coil 1100-3, and an unnecessary magnetic field leaks out of the wireless power transmission apparatus.

FIG. 12B shows a method of applying a reactive shielding coil in a structure that wraps three coils at once, wherein an additional circuit for opening the shielding coil is not required. Accordingly, the shielding coil structure of FIG. 12B may be configured more simply as compared to the shielding coil structure of FIG. 12A, thereby resulting in cost reduction. In FIG. 12B, when a first lower coil 1100-2 is activated, a current of the first lower coil 1100-2 is coupled to an upper coil 1100-1. In addition, even when the current of the upper coil 1100-1 is coupled to the second lower coil 1100-3, most of the unnecessary magnetic field leaking to an outside of the wireless power transmission apparatus may be shielded by the shielding coil 1150 that surrounds the plurality of transmission coils 1100.

Figure 13A:
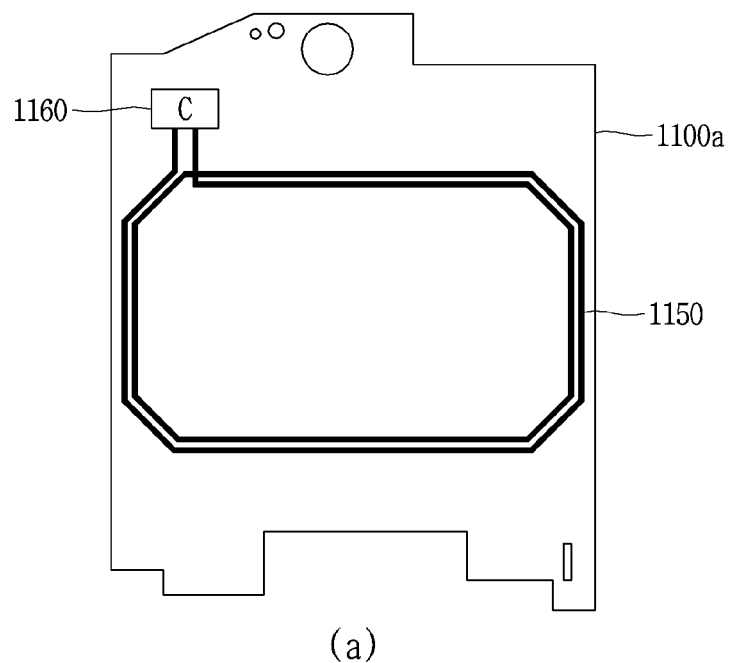
FIG. 13A shows a structure in which shielding coils are disposed on one side or both sides of a PCB according to the present specification.
Figure 13A:
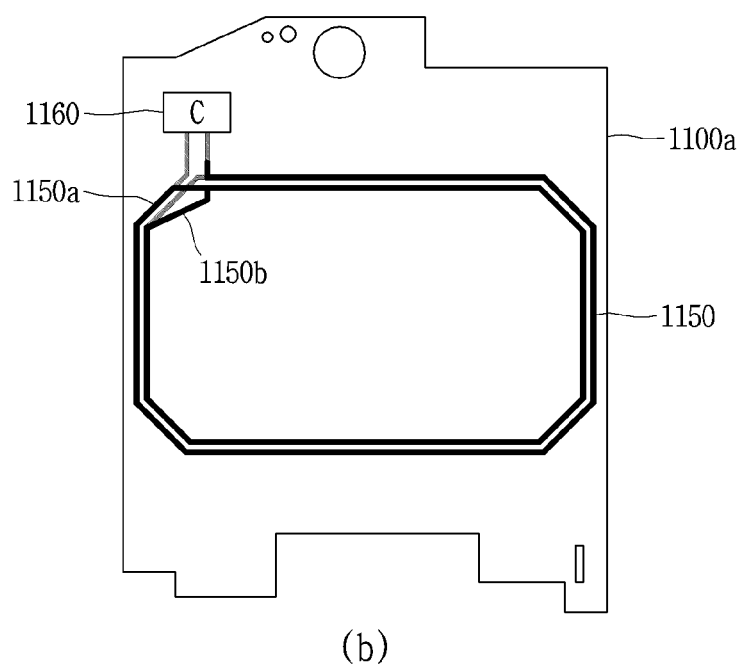
Figure 13B:
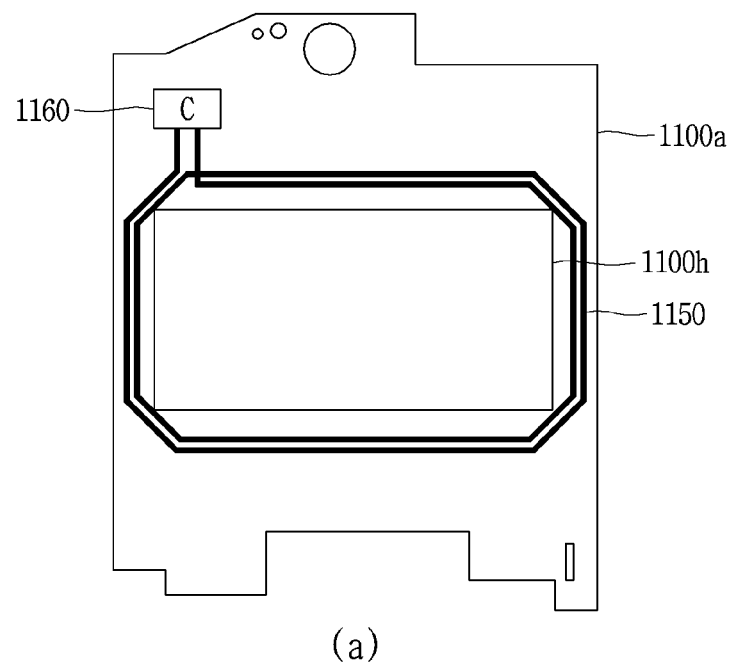
FIG. 13B shows a structure in which a transmission coil is disposed in an inner hole region of a PCB according to the present specification.
Figure 13B:
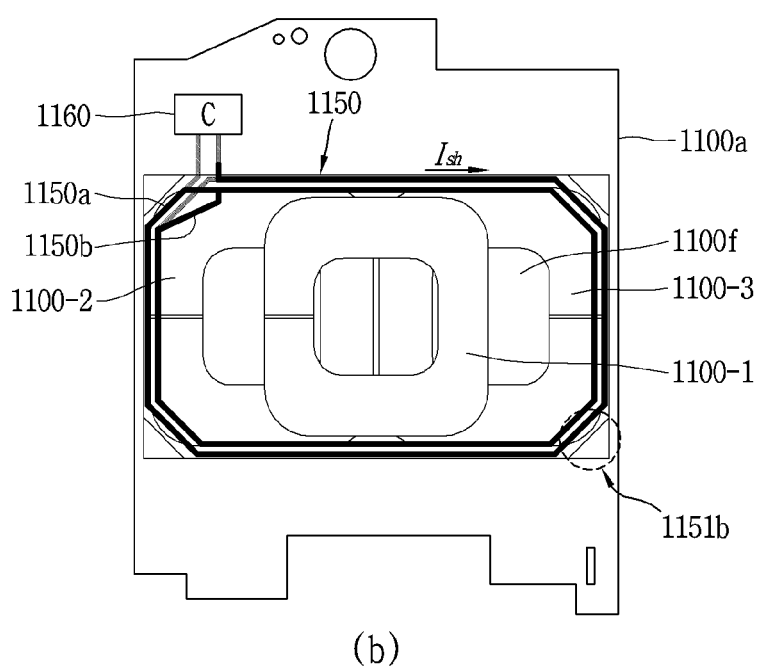

On the other hand, FIG. 13A shows a structure in which shielding coils are disposed on one side or both sides of a PCB according to the present specification. FIG. 13B shows a structure in which a transmission coil is disposed in an inner hole region of a PCB according to the present specification.

Referring to FIG. 12B and (a) of FIG. 13A, the shielding coil 1150 is disposed on one surface of a dielectric substrate, that is, a PCB 1100a, and configured in a loop shape having two or more turns to surround the plurality of transmission coils 1100. For an example, the shielding coil 1150 may include two turns, that is, an inner first turn of a conductive wire and a second turn of the conductive wire extending from the first turn of the conductive wire to be disposed outside the first turn. A capacitor 1160 may be disposed to connect an end portion of the first turn of the conductive wire and an end portion of the second turn of the conductive wire. Meanwhile, unlike the plurality of transmission coils 1100 that transmit wireless power, the shielding coil 1150 is configured to shield a magnetic field leaking to an external area and does not require a separate power supply.

Referring to FIG. 12B and (b) of FIG. 13A, the shielding coil 1150 is disposed on one surface (front surface) and the other surface (rear surface) of a dielectric substrate, that is, a PCB 1100a, and configured in a loop shape having two or more turns to surround the plurality of transmission coils 1100. For an example, the shielding coil 1150 may include a first shielding coil 1150a disposed on the front surface of the PCB 1100a and a second shielding coil 1150b disposed on the rear surface of the PCB 1100a. The first shielding coil 1150a is disposed to surround the plurality of transmission coils 1100 on one surface of the dielectric substrate, that is, the PCB 1100a. The second shielding coil 1150b is disposed to surround the plurality of transmission coils 1100 on the other surface of the dielectric substrate, that is, the PCB 1100a.

The first shielding coil 1150a may include two turns, that is, an inner first turn of a conductive wire and a second turn of the conductive wire extending from the first turn of the conductive wire to be disposed outside the first turn. A first capacitor may be disposed to connect an end portion of the first turn of the conductive wire and an end portion of the second turn of the conductive wire. The second shielding coil 1150b may include two turns, that is, an inner first turn of a conductive wire and a second turn of the conductive wire extending from the first turn of the conductive wire to be disposed outside the first turn. A second capacitor may be disposed to connect an end portion of the first turn of the conductive wire and an end portion of the second turn of the conductive wire.

The shape of the second shielding coil 1150b may be disposed to correspond to that of the first shielding coil 1150a. Accordingly, a second region of the dielectric substrate, that is, the PCB 1100a, on which the second shielding coil 1150b is disposed, may correspond to a first region of the dielectric substrate, that is, the PCB 1100a, on which the first shielding coil 1150a is disposed. In this regard, at least part of an upper region, a lower region, one side region, and the other side region in which the second shielding coil 1150b is disposed may correspond to at least part of an upper region, a lower region, one side region, and the other side region in which the first shielding coil 1150a is disposed.

The shape of a corner portion on one side where the second shielding coil 1150b is disposed may be defined to be different from that of a corner portion on one side where the first shielding coil 1150a is disposed. In this regard, a corner portion 1151a on one side where the first shielding coil 1150a is disposed may be defined at a first angle. A corner portion 1151b on one side where the second shielding coil 1150b is disposed may be defined at a second angle different from the first angle.

Outer coils of the first and second shielding coils 1150a, 1150b may also be disposed to correspond to each other at a corner portion on one side. On the contrary, inner coils of the first and second shielding coils 1150a, 1150b may be defined to be different from each other at a corner portion on one side. In this regard, first and second capacitance values of the first and second capacitors respectively connected to the first and second shielding coils 1150a, 1150b may be set to be different from each other. Positions where the first and second capacitors are disposed may be set to be the same. Alternatively, positions where the first and second capacitors are disposed may be differently set to a first position and a second position. Accordingly, a level of interference between electromagnetic waves leaking from the first and second shielding coils 1150a, 1150b to the outside through upper and lower regions of the PCB 1100a may be reduced.

The capacitor 1160 may be disposed at only one of the first and second shielding coils 1150a, 1150b disposed on first and second surfaces of the PCB 1100a presented in the present specification. The other one of the first and second shielding coils 1150a, 1150b may form a closed loop without a capacitor. For an example, the capacitor 1160 may be disposed only on the second shielding coil 1150b disposed on the second surface of the PCB 1100a. The first shielding coil 1150a disposed on the first surface of the PCB 1100a may form a closed loop without a capacitor.

For another example, each of the first and second shielding coils 1150a, 1150b may include first and second capacitors. The first and second resonant frequencies of the first and second shielding coils 1150a, 1150b may be configured differently by the first and second capacitors. Accordingly, electromagnetic waves can be shielded by the first and second shielding coils 1150a, 1150b in consideration of various arrangement forms in which the wireless power reception apparatus is disposed in the plurality of transmission coils 1100.

Meanwhile, each of the first shielding coil 1150a and the second shielding coil 1150b is configured to form a closed loop by the first capacitor and the second capacitor. Accordingly, the first shielding coil 1150a and the second shielding coil 1150b may shield leakage of electromagnetic waves by the plurality of transmission coils 1100.

In this regard, the first capacitor may be configured to connect an inner end portion and an outer end portion of the first shielding coil 1150a. The second capacitor may be configured to connect an inner end portion and an outer end portion of the second shielding coil 1150a. The first shielding coil 1150a may be defined in a two-turn closed loop shape on one surface of the dielectric substrate, that is, the PCB 1100a. The second shielding coil 1150b may be defined in a two-turn closed loop shape on the other surface of the dielectric substrate, that is, the PCB 1100a.

Referring to FIG. 12B and (a) of FIG. 13B, the plurality of transmission coils 1100 may be disposed inside a hole 1100h disposed in the dielectric substrate, that is, the PCB 1100a. In this regard, the shape of the shielding coil 1150 is not limited to a cross-sectional structure in (a) of FIG. 13A and may have a double-sided structure in (b) of FIG. 13A. Accordingly, referring to FIG. 12B and (a) of FIG. 13B, the shielding coil 1150 in (b) of FIG. 13B in addition to the shielding coil 1150 in (a) of FIG. 13B may be disposed in an outer region of the hole 1100h on the PCB 1100a in which the hole 1100h is disposed. Accordingly, the first shielding coil 1150a and the second shielding coil 1150b may be disposed on front and rear surfaces of the outer region of the hole 1100h, respectively, on the PCB 1100a in which the hole 1100h is disposed.

Referring to FIG. 12B and (b) of FIG. 13B, the first and second shielding coils 1150a, 1150b are disposed on the front and rear surfaces of the outer region of the hole 1100h on the PCB 1100a in which the hole 1100h is disposed as shown in (a) of FIG. 13B. In the structure of (b) of FIG. 13B, the plurality of transmission coils 1100, that is, the upper coil 1100-1 and the first and second lower coils 1100-2, 1100-3, may be disposed in the hole 1100h in the structure of (a) of FIG. 13B.

The plurality of transmission coils 1100 may be disposed inside the hole 1100h disposed in the dielectric substrate, that is, the PCB 1100a. In this regard, the shape of the shielding coil 1150 is not limited to a cross-sectional structure in (a) of FIG. 13A and may have a double-sided structure in (b) of FIG. 13A. Accordingly, referring to FIG. 12B and (a) of FIG. 13B, the shielding coil 1150 in (b) of FIG. 13B in addition to the shielding coil 1150 in (a) of FIG. 13B may be disposed in an outer region of the hole 1100h on the PCB 1100a in which the hole 1100h is disposed. Accordingly, the first shielding coil 1150a and the second shielding coil 1150b may be disposed on front and rear surfaces of the outer region of the hole 1100h, respectively, on the PCB 1100a in which the hole 1100h is disposed.

Figure 14:
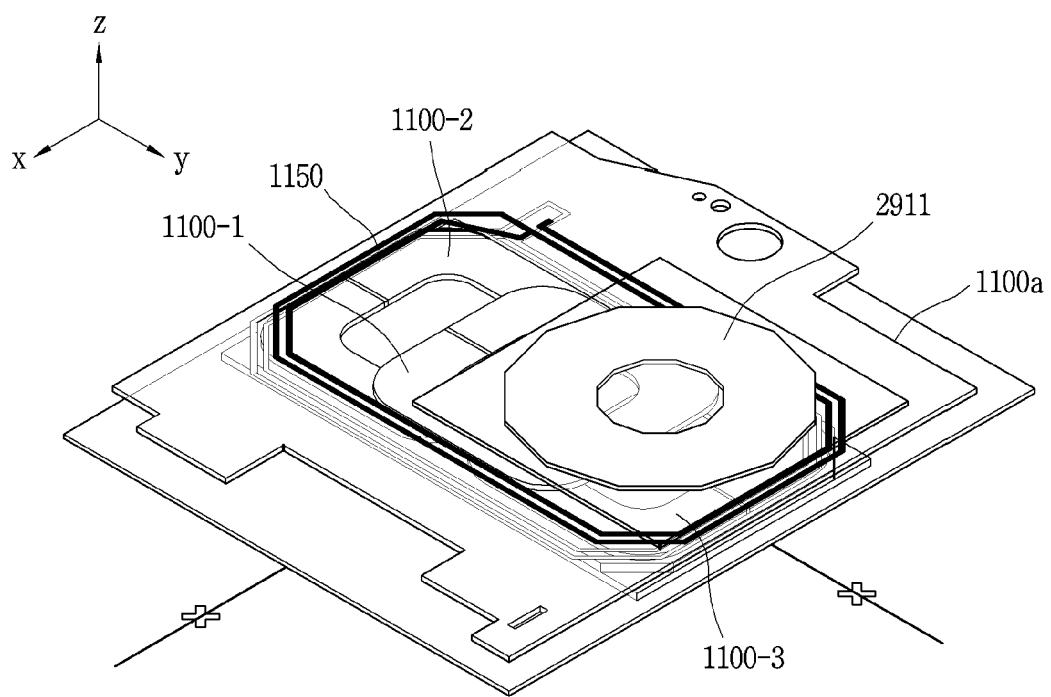
FIG. 14 shows a configuration in which a wireless power reception apparatus is disposed in an upper region of a wireless power transmission apparatus having a plurality of transmission coils and a shielding coil.

A wireless power transmission apparatus having a plurality of transmission coils and a shielding coil presented in this specification may transmit wireless power to a wireless power reception apparatus having a reception coil. In this regard, FIG. 14 shows a configuration in which a wireless power reception apparatus is disposed in an upper region of a wireless power transmission apparatus having a plurality of transmission coils and a shielding coil. Referring to FIG. 14, a reception coil 2911 of the wireless power reception apparatus may be configured to receive wireless power in a charging area in which a plurality of transmission coils 1100 are disposed. The reception coil 2911 may receive wireless power from the transmission coil corresponding to the disposed charging area, for example, the second lower coil 1100-3. Alternatively, when the reception coil 2911 is disposed in a charging area in which the upper coil 1100-1 and the second lower coil 1100-3 are disposed, wireless power may be received from the upper coil 1100-1 and the second lower coil 1100-3.

The wireless power transmission apparatus 100 according to the present specification will be described with reference to FIGS. 1, 2A, 4A, 5, 8, and 12A to 14. The wireless power transmission apparatus 100 may include a plurality of transmission coils 1100 and a shielding coil 1150. The wireless power transmission apparatus 100 may include a plurality of transmission coils 1110-1 to 1100-3, a shielding coil 1150, and a capacitor 1160.

The plurality of transmission coils 1100 are configured to transmit wireless power to a wireless power reception apparatus. The plurality of transmission coils 1100 may include an upper coil 1100-1 and a lower coil 1100-2, 1100-3. The plurality of transmission coils 1100 may include a first coil 1100-1 corresponding to the upper coil and a second coil 1100-2 and a third coil 1100-3 corresponding to the lower coil. The lower coil may include a first lower coil 1100-2 and a second lower coil 1100-3. Therefore, the upper coil 1100-1 is referred to as the first coil 1100-1, and the first lower coil 1100-2 and the second lower coil 1100-3 are respectively referred to as the second coil 1100-2 and the third coil 1100-3, but the present disclosure is not limited thereto.

The upper coil 1100-1 may have a form in which a conductive wire is wound in a rectangular shape. A corner portion of the upper coil 1100-1 may be defined in a round shape. The upper coil 1100-1 may be configured with a rectangular coil having an inner diameter and an outer diameter. A first coil region on one side of the first lower coil 1100-2 and a second coil region on the other side of the second lower coil 1100-3 may be disposed in an inner region of the upper coil 1100-1. Accordingly, even when the wireless power reception apparatus is disposed in an inner region of the upper coil 1100-1, wireless power may be transmitted through the first lower coil 1100-2 and/or the second lower coil 1100-3.

The upper coil 1100-1 may be configured to be disposed on a first layer. The first lower coil 1100-2 may be disposed on a second layer that is a lower layer of the first layer to overlap one side of the upper coil 1100-1. The second lower coil 1100-3 may be disposed on the second layer to overlap the other side of the upper coil 1100-1.

In this regard, the second layer on which the first lower coil 1100-2 and the second lower coil 1100-3 are disposed may be configured with of a ferrite substrate having magnetism. Accordingly, the first lower coil 1100-2 and the second lower coil 1100-3 may be implemented as a ferrite substrate. The upper coil 1100-1 may be disposed on the first layer corresponding to a general dielectric substrate. The upper coil 1100-1 may be disposed at an upper portion of the first lower coil 1100-2 and the second lower coil 1100-3 through an adhesive without a separate dielectric substrate.

The shape of the first lower coil 1100-2 and the second lower coil 1100-3 may be composed of a conductive wire wound in a rectangular shape. Corner portions of the first lower coil 1100-2 and the second lower coil 1100-3 may be defined in a round shape. Accordingly, the shapes of the first lower coil 1100-2 and the second lower coil 1100-3 may correspond to the shape of the upper coil 1100-1. Therefore, even when placed on boundaries of the upper coil 1100-1, the first lower coil 1100-2, and the second lower coil 1100-3 or moved within a charging area, the wireless power reception apparatus may continuously receive wireless power while maintaining a level of power.

The first lower coil 1100-2 and the second lower coil 1100-3 are configured with rectangular coils having an inner diameter and an outer diameter. The other side of the first lower coil 1100-2 and one side of the second lower coil 1100-3 are disposed adjacent to and spaced apart from the shielding coil 1150 to shield electromagnetic wave exposure due to wireless power transmission.

In this regard, one side of the first lower coil 1100-1 and the other side of the second lower coil 1100-2 may be disposed in parallel to and spaced apart from the shielding coil 1150. Accordingly, the shielding coil 1150 may be configured to absorb or shield electromagnetic waves leaking to the outside from one side of the first lower coil 1100-1 and the other side of the second lower coil 1100-2. In this regard, most of the wireless power transmitted through the first lower coil 1100-1 and the second lower coil 1100-2 is transmitted to the wireless power reception apparatus. On the contrary, part of the wireless power transmitted through the lower coil 1100-1 and the second lower coil 1100-2 may be exposed to the outside. However, the shielding coil 1150 may be disposed to surround the plurality of transmission coils 1110 to shield electromagnetic waves exposed to the outside.

The capacitor 1160 may be configured to connect one point and another point of the shielding coil 1150. The capacitor 1160 may be configured to connect one end and the other end of the shielding coil 1150.

Figure 15A:
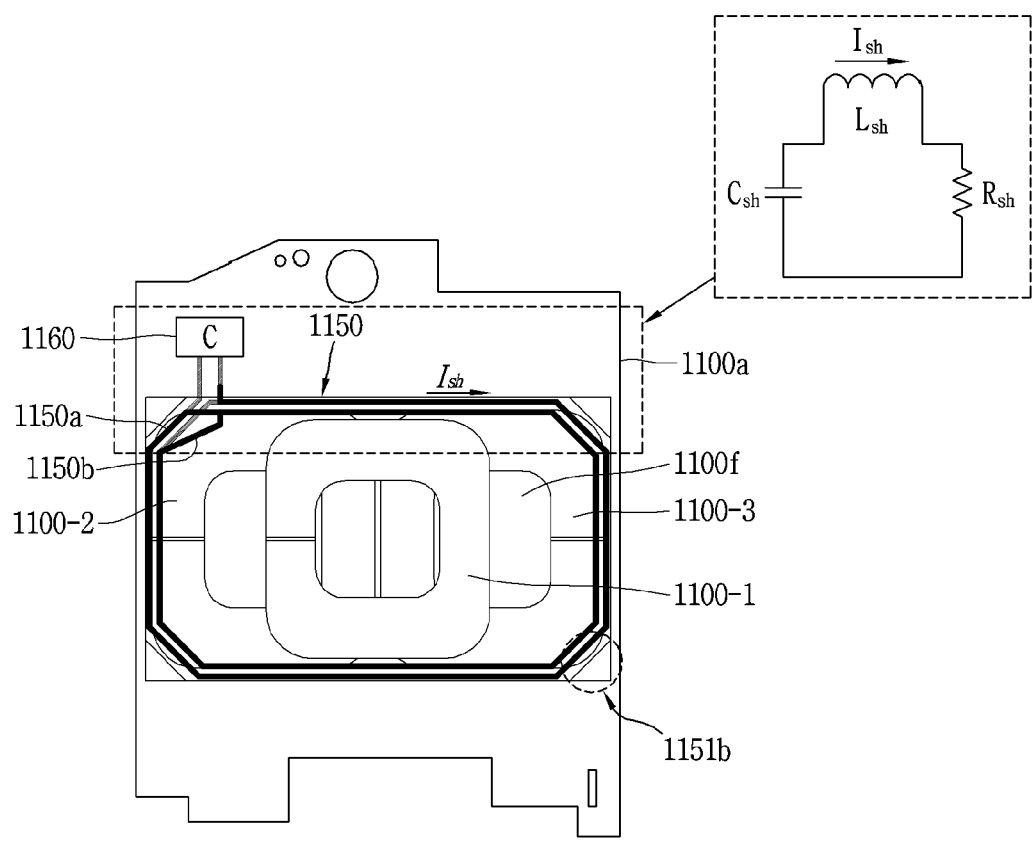
FIG. 15A shows an equivalent circuit of a shielding coil in a PCB in which a plurality of transmission coils and shielding coils according to the present specification are disposed.
Figure 15B:
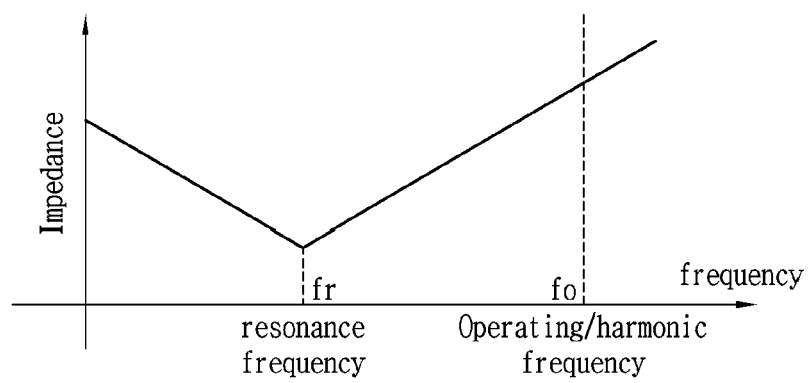
FIG. 15B is a diagram showing a relationship between a resonant frequency of a shielding coil and a wireless charging operating frequency due to a plurality of transmission coils.

The plurality of transmission coils 110 may be disposed inside the shielding coil 1150 disposed on the dielectric substrate, that is, the PCB 1100a. Meanwhile, with respect to a shielding coil structure according to the present specification, a principle of shielding electromagnetic waves by the shielding coil will be described. In this regard, FIG. 15A shows an equivalent circuit of a shielding coil in a PCB in which a plurality of transmission coils and shielding coils according to the present specification are disposed. On the other hand, FIG. 15B is a diagram showing a relationship between a resonant frequency of a shielding coil and a wireless charging operating frequency due to a plurality of transmission coils.

Referring to FIGS. 1, 2A, 4A, 5, 8, and 12A to 15A, the shielding coil 1150 may be equivalent to having a resistance component $R_{sh}$ and an inductance component $L_{sh}$. Meanwhile, it is assumed that the capacitance of the capacitor 1160 connecting one point and another point of the shielding coil 1150 is $C_{sh}$. In this regard, a current flowing through the shielding coil 1150 may be expressed as Equation 2.

$$I_{sh} = \frac{V_{ind}}{Z_{sh}} = \frac{-j\omega B_o e^{j\omega t} \cdot S}{\left(j\omega C_{sh} + \frac{1}{j\omega C_{sh}}\right) + R_{sh}} \quad \text{[Equation 2]}$$

Referring to FIGS. 1, 2A, 4A, 5, 8, and 12A to 15B, an operating region of the shielding coil 1150 is divided into a first operating region and a second operating region according to a capacitance value of the capacitor 1160 connecting different points of the shielding coil 1150. Referring to (a) of FIG. 15B, the shielding coil 1150 may operate in a first operating region, that is, an inductive region. That is, a resonant frequency $f_r$ of the shielding coil 1150 by an inductance component $L_{sh}$ of the shielding coil 1150 and a capacitance component $C_{sh}$ of the capacitor 1160 may be set to a frequency lower than a wireless charging operating frequency $f_o$ by the plurality of transmission coils 1110.

Referring to (b) of FIG. 15B, the shielding coil 1150 may operate in a second operating region, that is, a capacitive region. That is, the resonant frequency $f_r$ of the shielding coil 1150 by the inductance component $L_{sh}$ of the shielding coil 1150 and the capacitance component $C_{sh}$ of the capacitor 1160 may be set to a frequency higher than the wireless charging operating frequency $f_o$.

The shielding coil 1150 according to this specification may operate in an inductive region to shield external exposure of electromagnetic waves. In this regard, according to an impedance of the shielding coil 1150 to which the capacitor 1160 is connected, the current $I_{sh}$ flowing through the shielding coil may be determined as in Equation 3.

$$\text{Inductive region } (Z_{sh} \gg Z_{sh}) \quad I_{sh} = \frac{V_{ind}}{Z_{sh}} = \frac{-j\omega B_o e^{j\omega t} \cdot S}{j\omega L_{sh}} \quad \text{[Equation 3]}$$

$$\text{Capacitive region } (Z_{sh} \ll Z_{sh}) \quad I_{sh} = \frac{V_{ind}}{Z_{sh}} = \omega^2 B_o e^{j\omega t} \cdot S C_{sh}$$

In this regard, $B_0$ represents a magnetic flux density generated by a current flowing through the transmission coil 1100. Meanwhile, S represents an area of the shielding coil 1150 in which the magnetic flux density $B_0$ interlinks. In this regard, a direction of a magnetic field formed on one side and the other side of the plurality of transmission coils 1100 adjacent to the shielding coil 1150 is opposite to that of a magnetic field formed on the shielding coil 1150. Accordingly, the shielding coil 1150 may be configured to shield external exposure of electromagnetic waves by the plurality of transmission coils 1120.

In the inductive region, a first impedance due to an inductance component of the plurality of transmission coils 1100 and the shielding coil 1150 becomes dominant. That is, compared to the first impedance in the inductive region, a second impedance due to a capacitance value of the capacitor 1160 connected to the shielding coil 1150 may be ignored. For an example, a capacitance value may be set such that the first impedance due to the inductance component of the plurality of transmission coils 1100 and the shielding coil 1150 is about 10 times greater than the second impedance due to the capacitance value of the capacitor 1160 connected to the shielding coil 1150.

Due to the set capacitance value, it is established that a phase value of a current flowing through the shielding coil 1150 and a phase value of a current flowing through the transmission coil 1150 are in an out-of-phase relationship. Therefore, by adjusting the capacitance value of the capacitor 1160 connected to the shielding coil 1150, a current of opposite phase to that of the transmission coil 1110 may be induced in the shielding coil 1150. Accordingly, by adjusting the capacitance value of the capacitor 1160 connected to the shielding coil 1150, electromagnetic waves leaking to the outside from the plurality of transmission coils 1100 may be shielded.

In the capacitive region, the second impedance due to the capacitance value of the capacitor 1160 connected to the shielding coil 1150 is superior to the first impedance due to the inductance component of the plurality of transmission coils 1100 and the shielding coil 1150. That is, in the capacitive region, the first impedance due to the inductance component by the plurality of transmission coils 1100 and the shielding coil 1150 may be ignored. For an example, a capacitance value may be set such that the second impedance by the capacitance value of the capacitor 1160 connected to the shielding coil 1150 is about 10 times greater than the first impedance by the inductance component of the plurality of transmission coils 1100 and the shielding coil 1150.

Accordingly, it may be established that a phase value of a current flowing through the shielding coil 1150 and a phase value of a current flowing through the transmission coil 1150 are in an in-phase relationship. In this regard, a current having the same phase as that of the transmission coil 1110 may be induced in the shielding coil 1150. In this case, the external shielding effect of electromagnetic waves by the shielding coil 1150 is reduced. However, when the external exposure amount of electromagnetic waves is less than a threshold value, the shielding coil 1150 may operate in a second operating region, that is, a capacitive region, in order to increase the efficiency of wireless power transmission.

Figure 16:
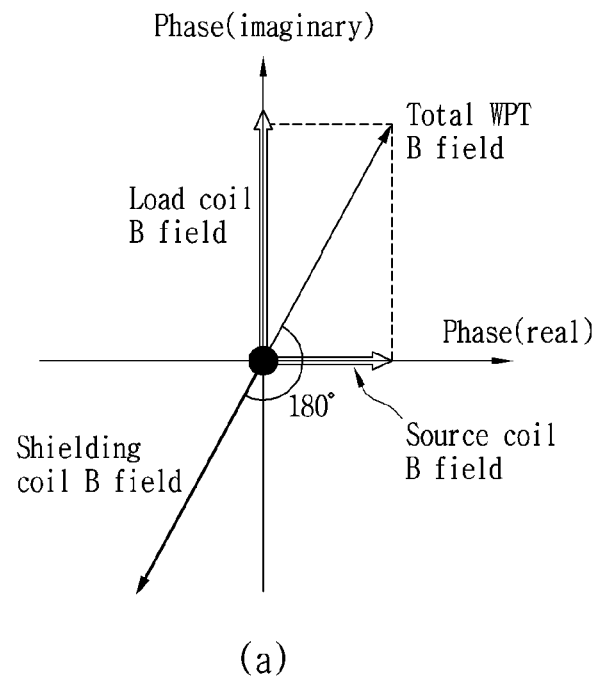
FIG. 16 shows a conceptual diagram in which a leakage magnetic field due to a transmission coil is canceled by a shielding coil according to the present specification.
Figure 16:
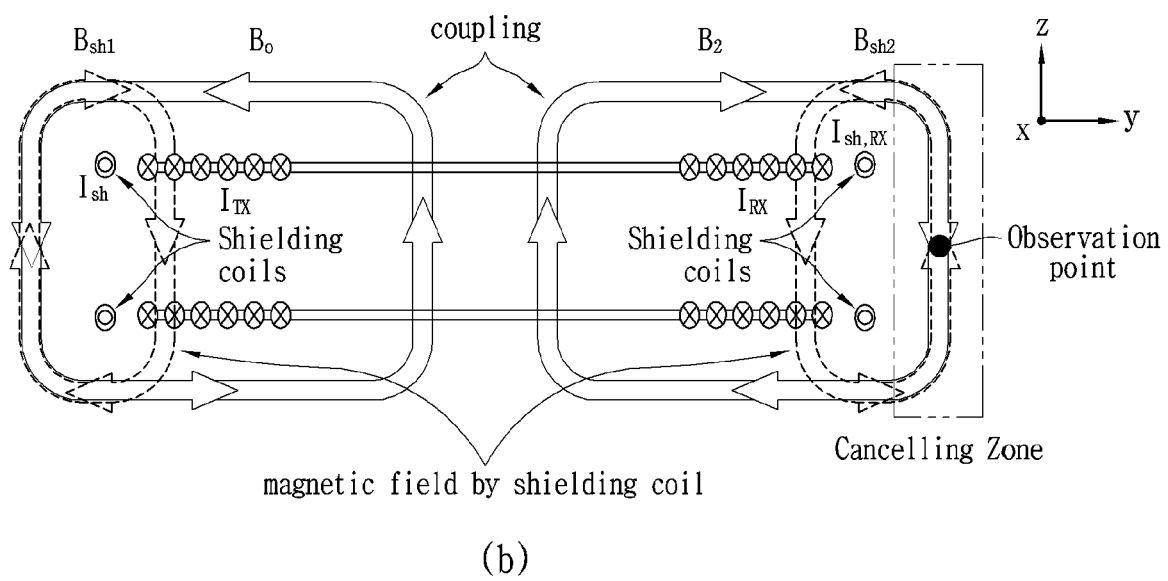

Meanwhile, the determination of the capacitance of the capacitor 1160 connected to the shielding coil 1150 in the present specification will be described in terms of a magnetic field induced in the transmission coil 1110 and the shielding coil 1150. In this regard, FIG. 16 shows a conceptual diagram in which a leakage magnetic field due to a transmission coil is canceled by a shielding coil according to the present specification. (a) of FIG. 16 shows phases of a magnetic field due to a transmission coil of a wireless power transmission apparatus, that is, a source coil and a load coil of a wireless power reception apparatus, and a magnetic field due to a shielding coil of the wireless power transmission apparatus. (b) of FIG. 16 is a conceptual diagram showing a magnetic field induced in a source coil and a load coil and a magnetic field induced in a shield coil.

Referring to FIGS. 12A to 16, in order to obtain a leakage magnetic field canceling effect by the shielding coil 1150, a current $I_{sh}$ of the shielding coil 1150 must have a phase difference of 180 degrees with a current of the transmission coil 1100.

When the shielding coil 1150 is designed to operate in an inductive region as shown in (a) of FIGS. 15B and (a) of FIG. 16, a 180-degree phase difference with the current of the transmission coil 1100 may be realized. To this end, a capacitance $C_{sh}$ associated with a resonant frequency of the shielding coil 1150 may be adjusted. Therefore, it is established that an impedance $Z_{Lsh}$ associated with the capacitance $C_{sh}$ of the shielding coil 1150 is greater than an impedance $Z_{Csh}$ by the capacitor 1160, that is, $Z_{Lsh} \ll $ Let $Z_{Csh}$. To this end, a distance between the shielding coil 1150 and the transmission coil 1160 and a capacitance of the capacitor 1160 may be determined. As described above, a resonant frequency of the shielding coil 1150 may be set to be lower than a driving frequency of the transmission coil 1110 of the wireless power transmission apparatus.

Figure 15B:
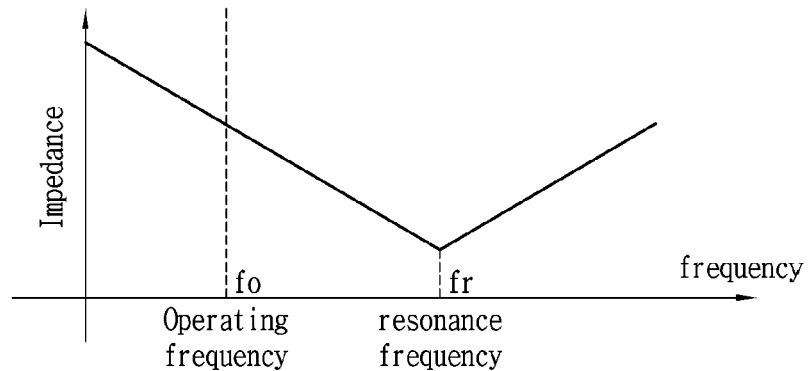

Referring to FIGS. 15A to 16, a direction of a current $I_{sh}$ flowing through the shielding coil 1150 is opposite to a direction of a current $I_{TX}$ flowing through the transmission coil 1110. Therefore, it is established that a phase value of a current flowing through the shielding coil 1150 and a phase value of a current flowing through the transmission coil 1110 are in an opposite-phase relationship. Meanwhile, the wireless power reception apparatus may include only a reception coil, that is, a load coil, and may not separately include a shielding coil. In (b) of FIG. 16, a load coil, that is, a secondary side coil, is not limited to a reception coil, and may be a second transmission coil to which a current of the first transmission coil is coupled. For an example, the first and second transmission coils may be the first and second lower coils 1100-2, 1100-3, but are not limited thereto.

Meanwhile, a shielding current $I_{sh,RX}$ may also be induced in the load coil to correspond to the current $I_{sh}$ flowing through the shielding coil 1150 of the wireless power transmission apparatus. A direction of the shielding current $I_{sh,RX}$ is opposite to a direction of a current $I_{RX}$ flowing in the reception coil. Accordingly, shielding of electromagnetic waves leaked due to wireless charging may be performed around both the wireless power transmission apparatus and the wireless power reception apparatus.

Therefore, a first shielding magnetic field $B_{sh1}$ may be formed on one side of the shielding coil 1150 in response to a first magnetic field $B_0$ induced in the first transmission coil. In addition, a second shielding magnetic field $B_{sh2}$ may be formed on the other side of the shielding coil 1150 in response to an induced magnetic field $B_2$ induced in the second transmission coil. The first and second shielding magnetic fields $B_{sh1}$, $B_{sh2}$ cancel leakage magnetic fields so that electromagnetic waves do not leak to an outside of the transmission coil. Accordingly, a canceling zone may be formed on one side and the other side of the transmission coil.

Meanwhile, in order to obtain the maximum offset effect of the leakage magnetic field, a current value flowing through the shielding coil 1150 may be adjusted or selected using the capacitor 1160 such that an AT (Ampere*Turn) of the shielding coil 1150 and an AT of the transmission coil 1100 match at a driving frequency of the wireless charger. A distance between the shielding coil 1150 and the transmission coil 1110 may be optimally selected in order to select an optimal value for a current flowing through the shielding coil 1150. In addition, a capacitance value of the capacitor 1160 may be optimally selected in order to select a current flowing through the shielding coil 1150 as an optimal value. Meanwhile, a distance between the shielding coil 1150 and the transmission coil 1110 and/or a capacitance value of the capacitor 1160 may be selected in consideration of a tradeoff between a leakage magnetic field offset effect and a charging efficiency.

Hereinafter, a configuration for wireless charging and wireless communication of a wireless power transmission apparatus having a plurality of transmission coils and shielding coils according to the present specification and a wireless power reception apparatus receiving wireless power will be described. In this regard, the FIGS. 17 and 18 are block diagrams exemplarily showing part of the configuration of a wireless power transmission apparatus and a wireless power reception apparatus according to the present disclosure.

Figure 17:
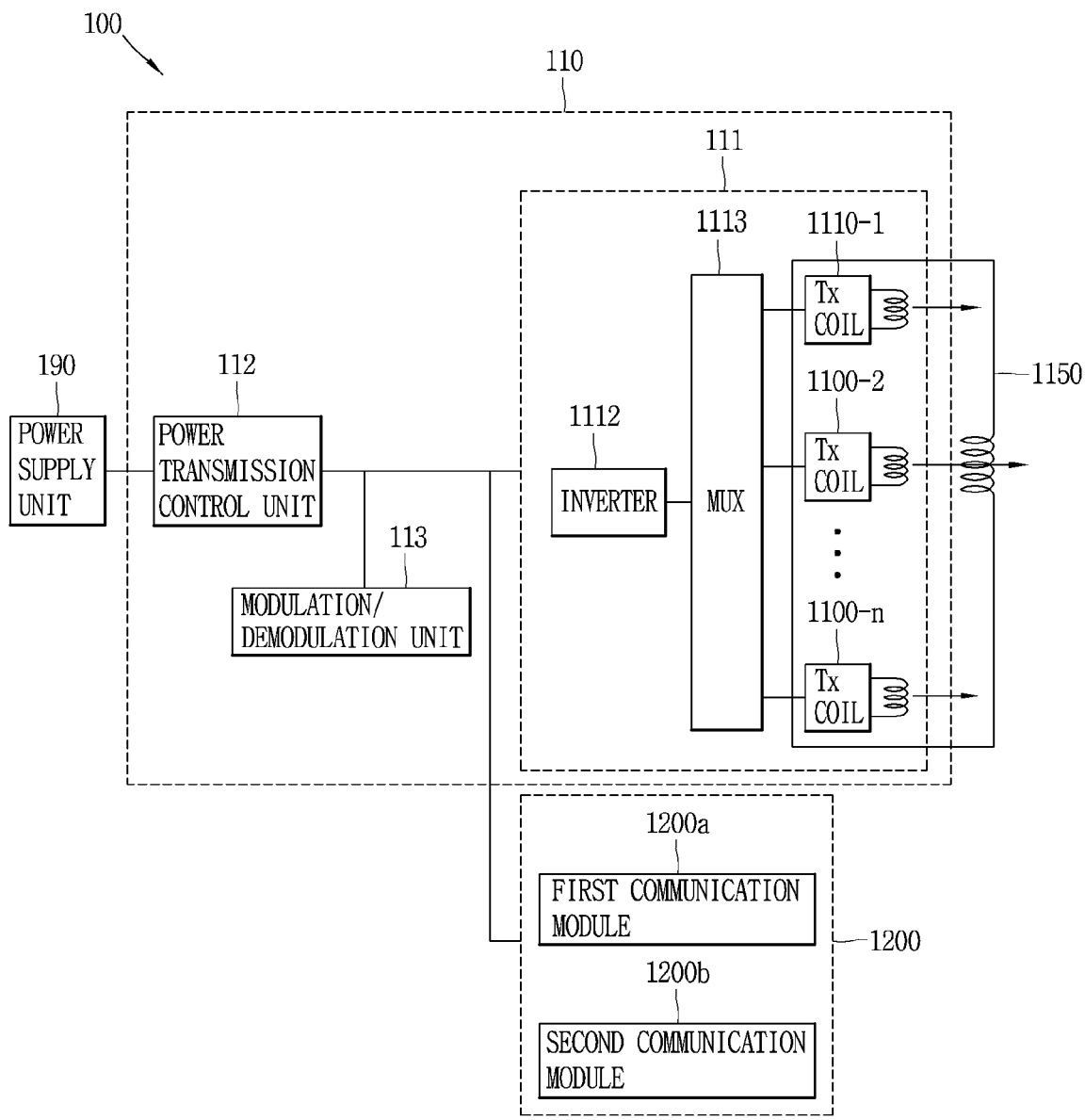
FIGS. 17 and 18 are block diagrams exemplarily showing part of the configuration of a wireless power transmission apparatus and a wireless power reception apparatus according to the present disclosure.

Referring to FIG. 17, the wireless power transmission apparatus 100 may include a power transmission unit 110, a communication unit 1200, and a power supply unit 190. The power transmission unit 110 may include a power conversion unit 111 and a power transmission control unit (hereinafter, referred to as a control unit) 112.

Figure 18:
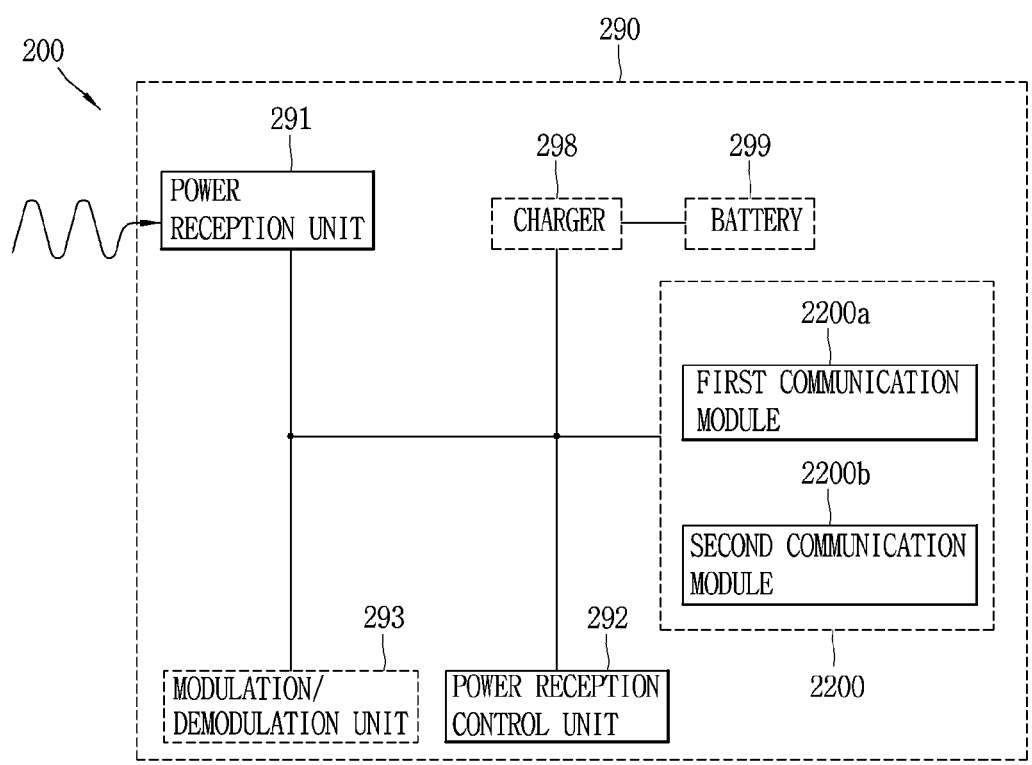

The power conversion unit 111 converts power supplied from the transmission-side power supply unit 190 into a wireless power signal to transmits the converted wireless power signal to the wireless power reception apparatus 200 of FIG. 18. The wireless power signal transmitted by the power conversion unit 111 is generated in the form of a magnetic field or electro-magnetic field having an oscillation characteristic. For this purpose, the power conversion unit 111 may be configured to include a coil for generating the wireless power signal.

The power conversion unit 111 may include a constituent element for generating a different type of wireless power signal according to each power transmission method. For example, the power conversion unit 111 may include primary coils (transmission coils) 1110-1, 1110-2, . . . , 1110-n that form a changing magnetic field to induce a current to a secondary coil of the wireless power reception apparatus 200 according to an inductive coupling method.

Furthermore, the power conversion unit 111 may transmit power using the aforementioned inductive coupling method.

On the other hand, the power conversion unit 111 may further include a circuit for controlling the characteristics of a used frequency, an applied voltage, an applied current or the like to form the wireless power signal.

The control unit 112 controls an overall operation of the wireless power transmission apparatus, such as each component included in the power transmission unit 110, the communication unit 1200, and the power supply unit 190.

On the other hand, an area (or region) to which the wireless power signal can be approached may be divided into two types. First, an active area denotes a region through which a wireless power signal transmitting power to the wireless power reception apparatus 200 is passed. Next, a detection area (semi-active area) denotes an interest region in which the wireless power transmission apparatus 100 can detect the presence of the wireless power reception apparatus 200. Here, the control unit 112 may detect whether the wireless power reception apparatus 200 is placed in the active area or detection area or removed from the area. Hereinafter, the active area or detection area will be commonly referred to as a "power transmission area".

Meanwhile, the power transmission apparatus according to the present disclosure may perform an analog detection process and a digital detection process described above through communication between the communication unit 1200 and the wireless power reception apparatus 200. Here, the analog detection process refers to a process of detecting the wireless power reception apparatus 200 in order to select the wireless power reception apparatus 200 that is present in the power transmission area. The power transmission area 1600a, 1600b, as described above, refers to an area in which an object within the relevant area can affect the characteristics of the power of the power conversion unit 111.

The control unit 112 may detect whether the wireless power reception apparatus 200a, 200b is located in the power transmission area and its located area using a first communication module 1200a provided in the communication unit 1200. That is, the control unit 112 performs an analog detection process that detects whether the reception apparatus capable of transmitting wireless power is present in the power transmission area 1600a, 1600b using the first communication module 1200a provided in the communication unit 200.

The control unit 112 may perform a process of identifying the wireless power reception apparatus 200 or determine whether to start wireless power transfer according to a result of detecting the presence of the wireless power reception apparatus 200, through the first communication module 1200a.

Furthermore, the control unit 112 may determine at least one characteristic of a frequency, a voltage, and a current of the power conversion unit 111 for forming the wireless power signal. The determination of the characteristic may be carried out by a condition at the side of the wireless power transmission apparatus 100 or a condition at the side of the wireless power reception apparatus 200.

The control unit 112 may receive a power control message from the wireless power reception apparatus 200. The control unit 112 may determine at least one characteristic of a frequency, a voltage and a current of the power conversion unit 111 based on the received power control message, and additionally perform other control operations based on the power control message.

For example, the control unit 112 may determine at least one characteristic of a frequency, a voltage and a current used to generate the wireless power signal according to the power control message including at least one of rectified power amount information, charging state information and identification information in the wireless power reception apparatus 200.

In addition, as another control operation using the power control message, the wireless power transmission apparatus 100 may perform a typical control operation associated with wireless power transmission based on the power control message. For example, the wireless power transmission apparatus 100 may receive information associated with the wireless power reception apparatus 200 to be auditorily or visually output or receive information required for authentication between devices, through the power control message.

The control unit 112 may detect whether a wireless power reception apparatus is present in a power transmission area through a first communication module to transmit and receive a control message with a wireless power reception apparatus through a second communication module in response to the detected presence. That is, since a transmission coil in the present disclosure can be used only to transmit wireless power to the wireless power reception apparatus, it is not necessary to radiate a medium or high-power current into the transmission coil to perform analog and digital detection processes with the wireless power reception apparatus.

The power conversion unit 111 of the wireless power transmission apparatus 100 according to the present specification may include one or more transmission coils 1110-1 to 1110-*n*. Each of the one or more transmission coils 1110-1 to 1110-*n* may form a power transmission area.

With reference to FIGS. 12A to 18, a configuration for shielding electromagnetic wave leakage in a wireless power transmission apparatus having a transmission coil and a shielding coil according to the present specification will be described in detail. The first communication module 1200*a* may be configured to detect a wireless power reception apparatus located in any one of power transmission areas corresponding to the plurality of transmission coils 1110-1 to 1110-3, respectively. The second communication module 1200*b* may be configured to transmit and receive a power control message with the wireless power reception apparatus in response to the detection of a wireless power reception apparatus located in any one power transmission area through the first communication module 1200*a*.

In this regard, one of the first and second communication modules 1200*a*, 1200*b* may be a communication module performing in-band communication and the other may be a communication module performing out-of-band communication. For an example, a communication module that performs in-band communication is configured to transmit and receive a wireless signal using the transmission coil 1100. On the contrary, a communication module that performs out-of-band communication is configured to transmit and receive a wireless signal through a component other than the transmission coil 1100, for instance, an antenna. In this regard, a communication module that performs out-of-band communication may use a wireless interface such as NFC and/or Bluetooth, but is not limited thereto.

Figure 19:
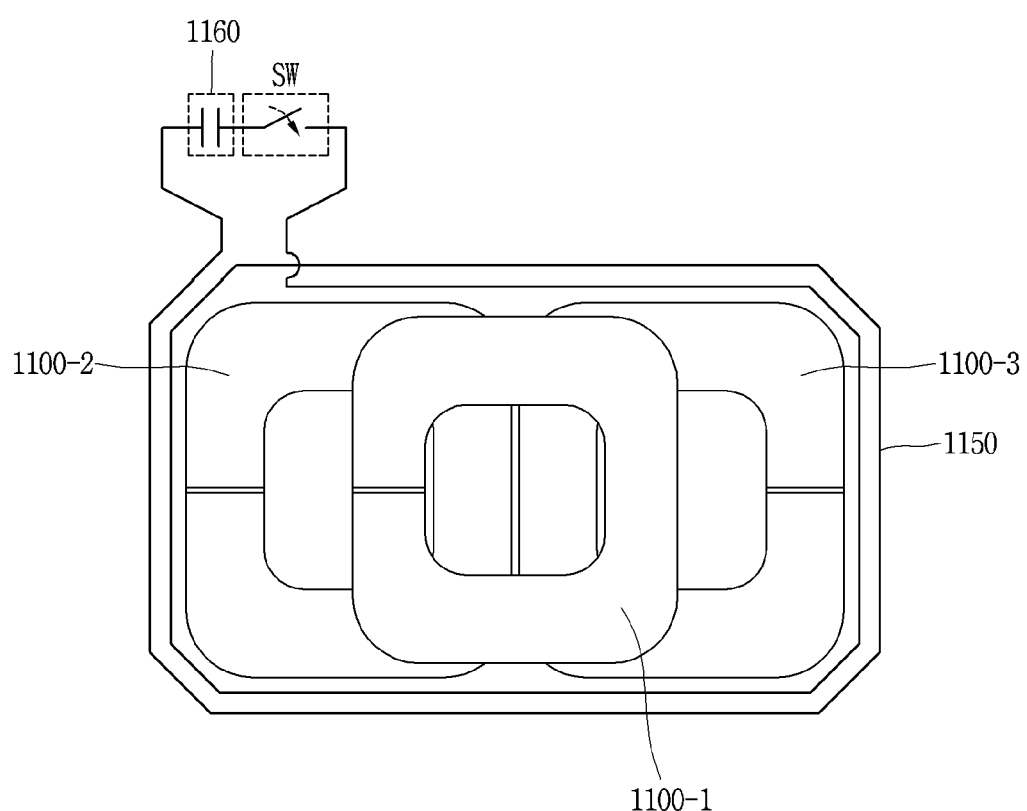
FIG. 19 shows a configuration in which a switch is disposed between a capacitor and a shielding coil according to the present specification.

The control unit 112 may be configured to transmit wireless power to a wireless power reception apparatus located in any one power transmission area and to control the capacitor 1160 so as to shield electromagnetic wave exposure due to the transmission of wireless power. Meanwhile, the wireless power transmission apparatus may further include a component for changing an operating state of the shielding coil, for example, a switch. In this regard, FIG. 19 shows a configuration in which a switch is disposed between a capacitor and a shielding coil according to the present specification.

Referring to FIGS. 12A to 19, the wireless power transmission apparatus may further include a switch SW disposed between the capacitor 1160 and the shielding coil 1150 to control the capacitor 1160 to be connected to or opened from the shielding coil 1150. In this regard, when the switch SW is in a closed state, the shielding coil 1150 is configured as a closed loop, and the wireless power transmission apparatus operates in a first mode to block electromagnetic wave leakage. Meanwhile, when the switch SW is in an open state, the shielding coil 1150 is configured as an open loop, and the wireless power transmission apparatus operates in a second mode to increase charging efficiency rather than blocking electromagnetic wave leakage.

When it is determined that the wireless power reception apparatus is disposed on the upper coil 1100-1, the control unit 112 controls the switch SW to connect the capacitor 1160 to the shielding coil 1150 so as to shield electromagnetic wave exposure due to the transmission of wireless power. In this regard, the upper coil 1100-1 is sufficiently spaced from the shielding coil 1150 on one side and the other side. Therefore, even when the shielding coil 1150 operates in the first mode to block electromagnetic wave leakage, there is little reduction in efficiency when charging through the upper coil 1100-1.

Meanwhile, when it is determined that the wireless power reception apparatus is disposed on the first lower coil 1100-2 or the second lower coil 1100-3, the control unit 112 controls the switch SW to open the capacitor 1160 so as not to be connected to the shielding coil 1150. In this regard, the first and second lower coils 1100-2, 1100-3 are disposed adjacent to the shielding coil 1150 on one side and the other side. Accordingly, the shielding coil 1150 may be operated in the second mode to increase charging efficiency when electromagnetic wave leakage is not large.

However, it is not limited to such a mode control method, and other methods may also be applied thereto depending on an amount of power or a charging rate transmitted to the wireless power reception apparatus. For an example, when the required amount of power or high charging rate is below a threshold value (or threshold rate), the control unit 112 may control the switch SW to be closed so as to shield electromagnetic waves even when the reception apparatus is disposed on the lower coils 1100-2, 1100-3. For another example, when a high amount of power is required or a high charging rate is required, the control unit 112 may control the switch SW to be opened so as to increase an amount of charge even when the reception apparatus is disposed on the upper coil 1100-1.

Meanwhile, the control unit 112 may determine whether the wireless power reception apparatus is disposed on the first lower coil 1100-2 or the second lower coil 1100-3 and electromagnetic wave exposure due to wireless power transmission is above a threshold value. When electromagnetic wave exposure is above a threshold value, the control unit 112 may control the switch SW to connect the capacitor 1160 to the shielding coil 1150 so as to shield electromagnetic wave exposure due to the transmission of wireless power.

The control unit 112 may control the switch SW based on at least one of an amount of power, a charging rate, and a battery level of the wireless power reception apparatus included in a power control message to control the operation mode of the shielding coil 1150 to be driven in a first mode or a second mode. In this regard, the control unit 112 may control the power conversion unit 111 and the plurality of transmission coils 1110 to transmit wireless power to a wireless power reception apparatus located in any one power transmission area based on a power control message. Based on the power control message, the control unit 112 may control the switch SW to shield electromagnetic wave exposure due to the transmission of wireless power. For an example, when the amount of power to be transmitted to the wireless power reception apparatus is above a threshold value or the charging rate is above a threshold rate, the control unit 112 opens the switch SW to drive the shielding coil 1150 in the second mode so as to increase charging efficiency. On the contrary, when the amount of power to be transmitted to the wireless power reception apparatus is below the threshold value or the charging rate is below the threshold rate, the control unit 112 closes the switch SW to block electromagnetic wave leakage.

Referring to FIGS. 12A to 18, the capacitor 1160 may be configured as a variable capacitor to optimize charging efficiency and blocking of electromagnetic wave leakage. In this regard, the control unit 112 may operate the shielding coil 1150 in an inductive region as shown in (a) of FIG. 15B. The control unit 112 may control the variable capacitor 1160 such that a resonant frequency of the shielding coil 1150 is set to a frequency lower than a wireless charging operating frequency due to the plurality of transmission coils 1110.

In this regard, the control unit 112 may determine whether the amount of power is above a threshold value according to wireless power transmission. The control unit 112 controls the switch SW based on at least one of an amount of power, a charging rate, and a battery level of the wireless power reception apparatus included in a power control message. Accordingly, the control unit 112 may control the operating mode of the shielding coil 1150 to be driven in a first mode or a second mode.

For an example, the control unit 112 may increase a resonant frequency of the shielding coil 1150 to increase charging efficiency when the amount of power is above a threshold value or the charging rate is above a threshold value according to wireless power transmission. In this regard, the amount of power or charging rate is requested or required by the wireless power reception apparatus, and the amount of power or charging rate may be included in the power control message. The control unit 112 may control the variable capacitor 1160 to have a frequency lower than the wireless charging operating frequency while increasing the resonant frequency of the shielding coil 1150.

Meanwhile, the control unit 112 may decrease the resonant frequency of the shielding coil 1150 to shield electromagnetic wave leakage when the amount of power below a threshold value or the charging rate is below a threshold value according to wireless power transmission. The control unit 112 may control the variable capacitor 1160 such that the resonant frequency of the shielding coil 1150 is reduced to operate in an inductive region.

Figure 20:
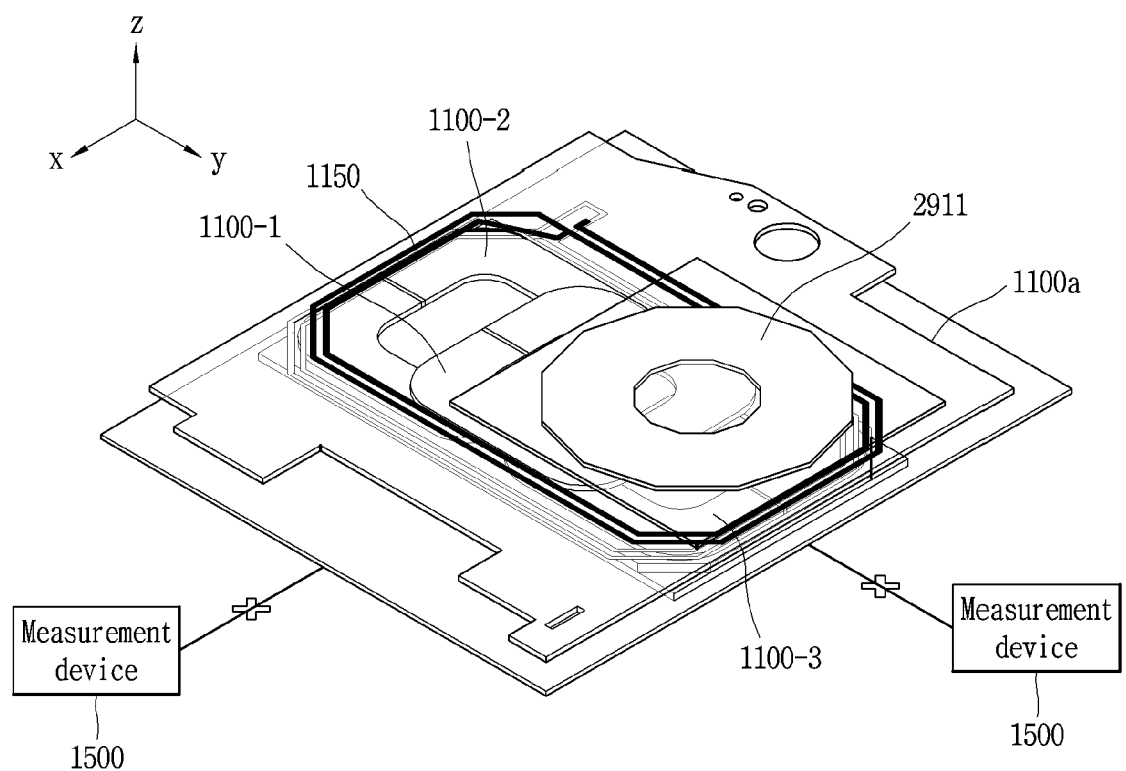
FIG. 20 shows a configuration of a wireless power transmission system having a plurality of transmission coils, a shielding coil, and a reception coil according to the present specification.

Hereinafter, an effect of shielding electromagnetic waves due to the shielding coil provided outside the transmission coil according to the present specification will be described. In this regard, FIG. 20 shows a configuration of a wireless power transmission system having a plurality of transmission coils, a shielding coil, and a reception coil according to the present specification. In FIG. 20, a magnetic field measuring apparatus 1500 may be spaced apart from the wireless power transmission apparatus by a predetermined distance on an x-axis or a y-axis to measure leaked electromagnetic waves.

Figure 21:
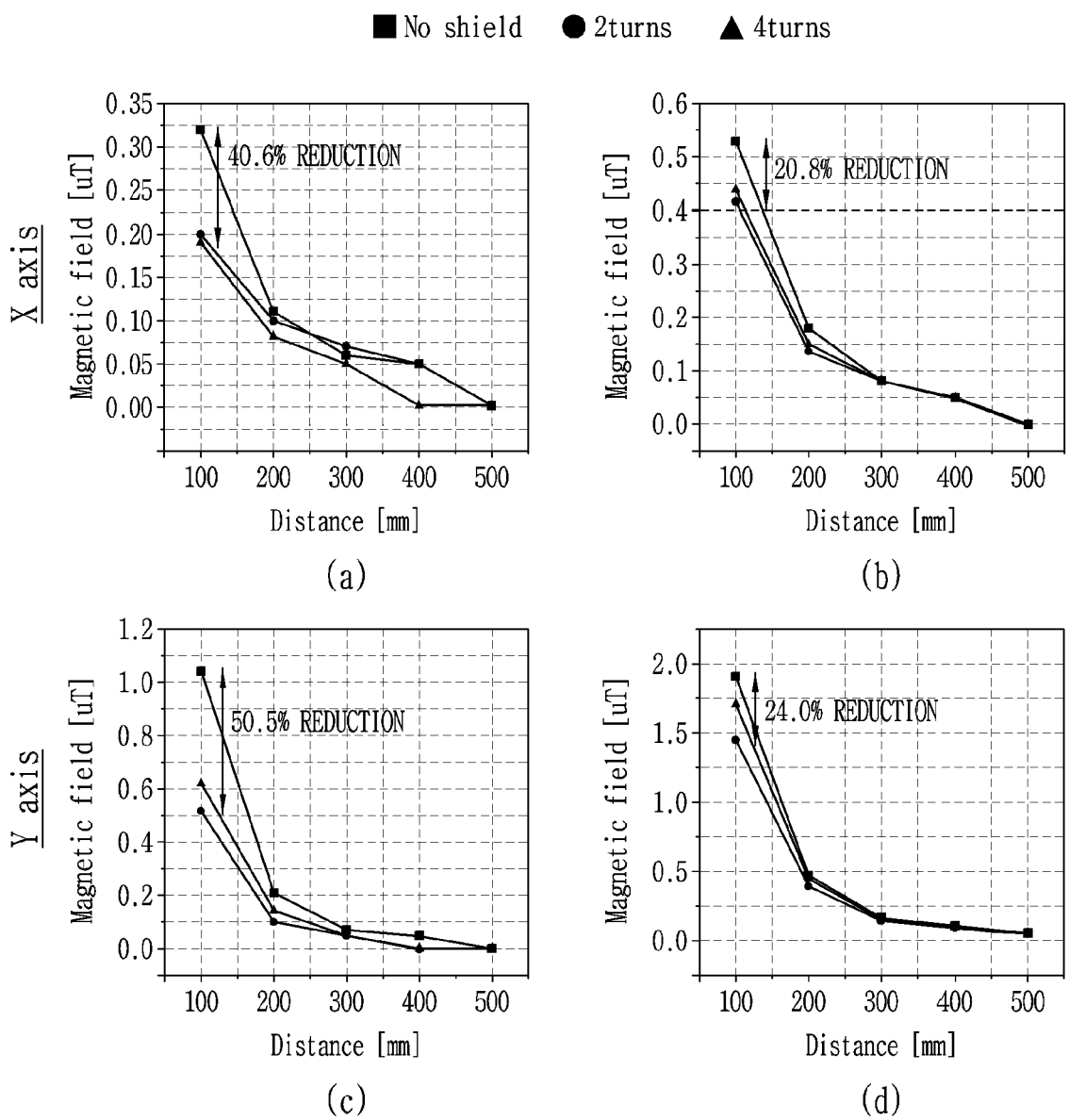
FIG. 21 shows a change in magnetic field according to a distance in configuration 1 without a shielding coil, configuration 2 in which a 2-turn shielding coil is disposed on one side of a PCB, and configuration 3 in which a 4-turn shielding coil is disposed on one side of a PCB.

On the other hand, FIG. 21 shows a change in magnetic field according to a distance in configuration 1 without a shielding coil, configuration 2 in which a 2-turn shielding coil is disposed on one side of a PCB, and configuration 3 in which a 4-turn shielding coil is disposed on one side of a PCB.

In this regard, referring to (a) and (b) of FIG. 21, a magnetic field according to a change in distance in an x-axis direction from the wireless power transmission apparatus is shown. (a) of FIG. 21 shows a magnetic field according to a change in distance in an x-axis direction when the wireless power reception apparatus is disposed in a region where the upper coil 1100-1 is disposed. (b) of FIG. 21 shows a magnetic field according to a change in distance in an x-axis direction when the wireless power reception apparatus is disposed in a region where the second lower coils 1100-2 and 1100-3 are disposed.

Referring to FIG. 20 and (a) of FIG. 21, when the reception apparatus is disposed in an upper coil region, a magnetic field in structures 2 and 3 in which shielding coils are disposed at a distance of about 100 mm apart in an x-axis direction is reduced by about 40.8% as compared to that in structure 1. Referring to FIG. 19 and (b) of FIG. 20, when the reception apparatus is disposed in a lower coil region, a magnetic field in structures 2 and 3 in which shielding coils are disposed at a distance of about 100 mm apart in an x-axis direction is reduced by about 20.8% as compared to that in structure 1.

Referring to (c) and (d) of FIG. 21, a magnetic field according to a change in distance in a y-axis direction from the wireless power transmission apparatus is shown. (c) of FIG. 20 shows a magnetic field according to a change in distance in a y-axis direction when the wireless power reception apparatus is disposed in a region where the upper coil 1100-1 is disposed. (b) of FIG. 20 shows a magnetic field according to a change in distance in a y-axis direction when the wireless power reception apparatus is disposed in a region where the second lower coils 1100-2 and 1100-3 are disposed.

Referring to FIG. 20 and (c) of FIG. 21, when the reception apparatus is disposed in an upper coil region, a magnetic field in structures 2 and 3 in which shielding coils are disposed at a distance of about 100 mm apart in a y-axis direction is reduced by about 50.5% as compared to that in structure 1. Referring to FIG. 19 and (d) of FIG. 20, when the reception apparatus is disposed in a lower coil region, a magnetic field in structures 2 and 3 in which shielding coils are disposed at a distance of about 100 mm apart in a y-axis direction is reduced by about 24.0% as compared to that in structure 1.

The shielding effect of structure 3 in which a 4-turn shielding coil is disposed on one surface is rather reduced as compared to structure 2 in which a 2-turn shielding coil is disposed. Accordingly, the number of turns for shielding electromagnetic waves per layer may be 4 turns or less, that is, 2 turns or 3 turns. In this regard, an optimal number of turns for shielding electromagnetic waves is set to 2 turns per layer. Meanwhile, in order to increase an effect of shielding electromagnetic waves, the number of turns per layer may be 2 and the number of layers may be increased. For example, when a 4-turn shielding coil is disposed, a 2-turn first shielding coil 1150a may be disposed on a front surface of the PCB 1100a and a 2-turn second shielding coil 1150b may be disposed on a rear surface of the PCB 1100a. The first shielding coil 1150a and the second shielding coil 1150b may be configured to be interconnected at an arbitrary point through a via hole.

A shielding coil structure proposed in this specification is expected to be a powerful means to solve a leakage field issue caused by a large active area of a multi-array coil and increased charging power.

Meanwhile, a distance between the plurality of transmission coils 1110 and the shielding coil 1150 may be determined in consideration of electromagnetic wave leakage shielding and charging efficiency. A first distance between a boundary of the other side of the first lower coil 1100-2 and the shielding coil 1150 may be set to be below a first threshold distance. A second distance between a boundary of one side of the second lower coil 1100-3 and the shielding coil 1150 may also be set to be below the first threshold distance. Meanwhile, the first and second distances between the shielding coil 1150 and the first and second lower coils 1100-2, 1100-3 may be set to be above a minimum distance in consideration of charging efficiency. In this regard, an arrangement structure between the shielding coil 1150 and the first and second lower coils 1100-2, 1100-3 may be configured in a left-right symmetrical shape.

A third distance between an upper end portion of the plurality of transmission coils 1110 and the shielding coil 1150 may be set to be below a second threshold distance. A fourth distance between a lower end portion of the plurality of transmission coils 1110 and the shielding coil 1150 may also be set to be below the second threshold distance. Meanwhile, the third and fourth distances between the shielding coil 1150 and the first and second lower coils 1100-2, 1100-3 may be set to be above a minimum distance in consideration of charging efficiency. In this regard, an arrangement structure between the shielding coil 1150 and the first and second lower coils 1100-2, 1100-3 may be configured in a left-right symmetrical shape.

The first threshold distance and the second threshold distance may be determined in consideration of a leakage magnetic field reduction effect in (a) to (d) of FIG. 21. In (a) to (d) of FIG. 21, when a distance to the transmission apparatus for the shielding effect is 100 mm, the first threshold distance and the second threshold distance may be determined to be about $\frac{1}{10}$, but are not limited thereto. In (a) to (d) of FIG. 20, when a distance to the transmission apparatus for the shielding effect is 150 mm, the first threshold distance and the second threshold distance may be determined to be about $\frac{1}{10}$, but are not limited thereto.

Meanwhile, a shielding coil structure according to the present specification may increase the number of capacitors or may be configured to operate in an inductive region through a plurality of layer structures. When the number of capacitors is increased to operate in the inductive region, cost may increase due to the increase in the number of capacitors. In addition, charging efficiency may be slightly reduced due to a resistance component of the capacitor. Accordingly, a structure and method of allowing the shielding coil to operate in an inductive region through a plurality of layer structures will be described.

Figure 22:
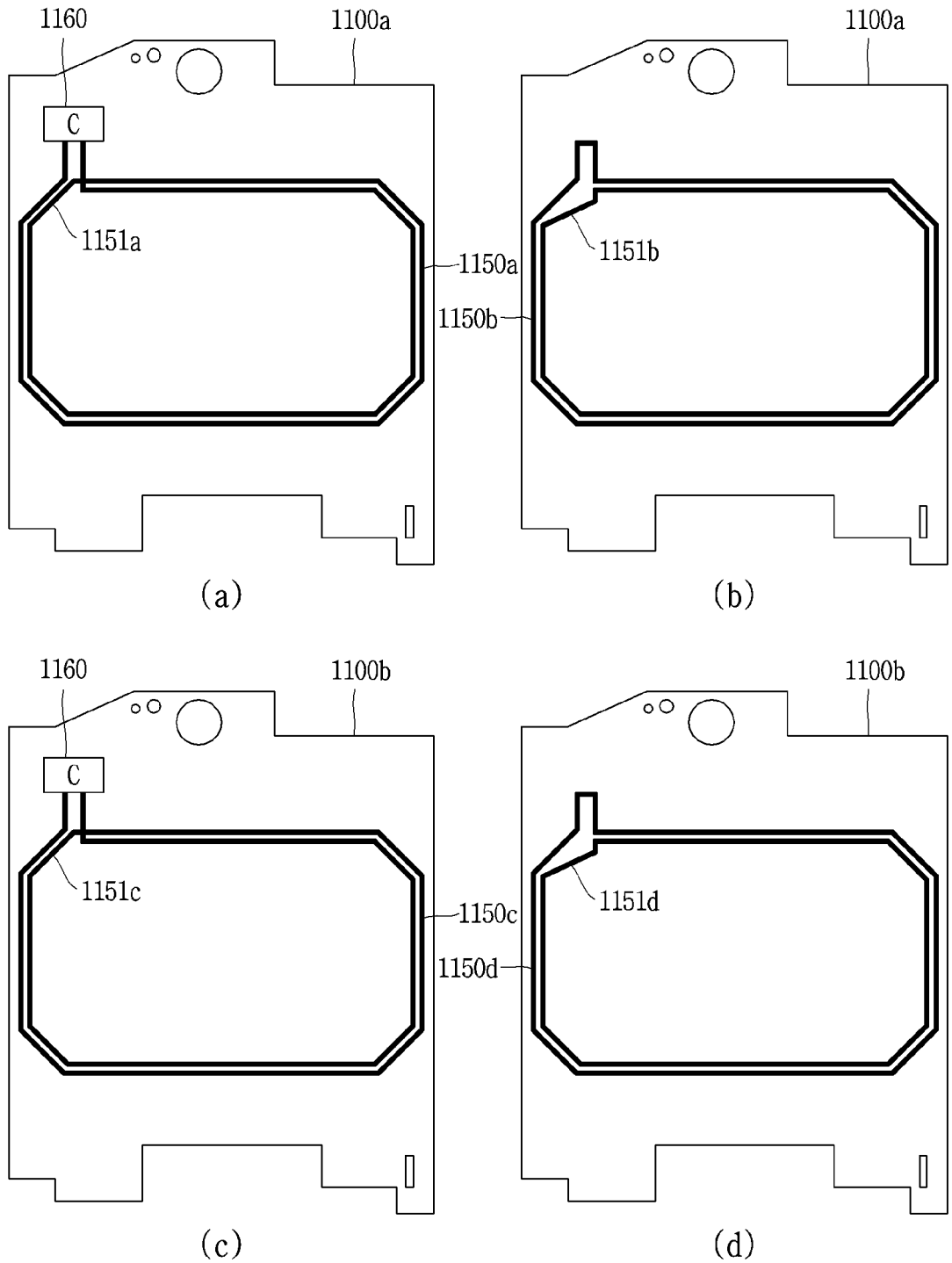
FIG. 22 shows each layer of a shielding coil consisting of a plurality of layers.

In this regard, FIG. 22 shows each layer of a shielding coil consisting of a plurality of layers. (a) to (d) of FIG. 22 show shielding coil structures disposed in first to fourth layers.

Referring to (a) to (d) of FIG. 22, the shielding coil 1150 may include a first shielding coil 1150*a* to a fourth shielding coil 1150*d*. In this regard, the number of layers on which the shielding coil 1150 is disposed is not limited to four, and may be changed to two, three, or four depending on its application. The first shielding coil 1150*a* to the fourth shielding coil 1150*d* may be disposed on different layers, that is, a first PCB to a fourth PCB. For another example, the first shielding coil 1150*a* to the fourth shielding coil 1150*d* may be disposed on front and rear surfaces of the first PCB and front and rear surfaces of the second PCB, respectively.

The first shielding coil 1150*a* is disposed to surround the plurality of transmission coils 1100 on one surface of the PCB 1100*a*. The second shielding coil 1150*b* is disposed to surround the plurality of transmission coils 1100 on the other surface of the PCB 1100*a*. The third shielding coil 1150*c* is disposed to surround the plurality of transmission coils 1100 on one surface of the third PCB 1100*a*. The fourth shielding coil 1150*d* is disposed to surround the plurality of transmission coils 1100 on the other surface of the second PCB 1100*b*.

Each of the first to fourth shielding coils 1150*a* to 1150*d* may include two turns, that is, an inner first turn of a conductive wire and a second turn of the conductive wire extending from the first turn of the conductive wire to be disposed outside the first turn. A first capacitor 1160 may be disposed to connect an end portion of the first turn of the conductive wire and an end portion of the second turn of the conductive wire. In this regard, the capacitor 1160 may be disposed only on any one of the first to fourth shielding coils 1150*a* to 1150*d*, for example, the first shielding coil 1150*a*, but is not limited thereto. The capacitors 1160 may be disposed on two or more layers.

Each of the first to fourth shielding coils 1150*a* to 1150*d* may be configured with a rectangular coil with four corner portions having inclined or rounded shapes. The first to fourth shielding coils 1150*a* to 1150*d* may be configured with a first type coil or a second type coil, as shown in FIGS. 13A and 13B.

For an example, the shape of a corner portion on one side where the second shielding coil 1150*b* is disposed may be defined to be different from that of a corner portion on one side where the first shielding coil 1150*a* is disposed. In this regard, a corner portion 1151*a* on one side where the first shielding coil 1150*a* is disposed may be defined at a first angle. A corner portion 1151*b* on one side where the second shielding coil 1150*b* is disposed may be defined at a second angle different from the first angle. Accordingly, a level of interference between electromagnetic waves leaking from the first and second shielding coils 1150*a*, 1150*b* to the outside through upper and lower regions of the first PCB 1100*a* may be reduced.

For an example, the shape of a corner portion on one side where the fourth shielding coil 1150*d* is disposed may be defined to be different from that of a corner portion on one side where the third shielding coil 1150*c* is disposed. In this regard, a corner portion 1151*c* on one side where the third shielding coil 1150*c* is disposed may be defined at a first angle. A corner portion 1151*d* on one side where the fourth shielding coil 1150*d* is disposed may be defined at a second angle different from the first angle. Accordingly, a level of interference between electromagnetic waves leaking from the third and fourth shielding coils 1150*c*, 1150*d* to the outside through upper and lower regions of the second PCB 1100*b* may be reduced.

In the above, a wireless power transmission apparatus having a shielding coil according to an aspect of the present specification has been described. Hereinafter, a wireless power transmission system including a wireless power transmission apparatus having a shielding coil and a wireless power reception apparatus disposed in a charging area according to another aspect of the present specification will be described. Meanwhile, all descriptions of the wireless power transmission apparatus having a shielding coil according to an aspect of the present specification may also be applied to the following wireless power transmission system.

The subject matter to be claimed in a wireless power transmission apparatus having a shielding coil and a method of controlling the same in the present specification may be extended to a wireless power reception apparatus and a wireless power transmission system including the same in addition to the wireless power transmission apparatus. In this regard, FIG. 22 shows a wireless power transmission system including a wireless power transmission apparatus and a wireless power reception apparatus.

The wireless power transmission system includes a wireless power transmission apparatus 100 and a wireless power reception apparatus 200. In this regard, FIG. 23 shows a configuration of a wireless power transmission system including a wireless power transmission apparatus and one or more electronic devices.

Figure 23:
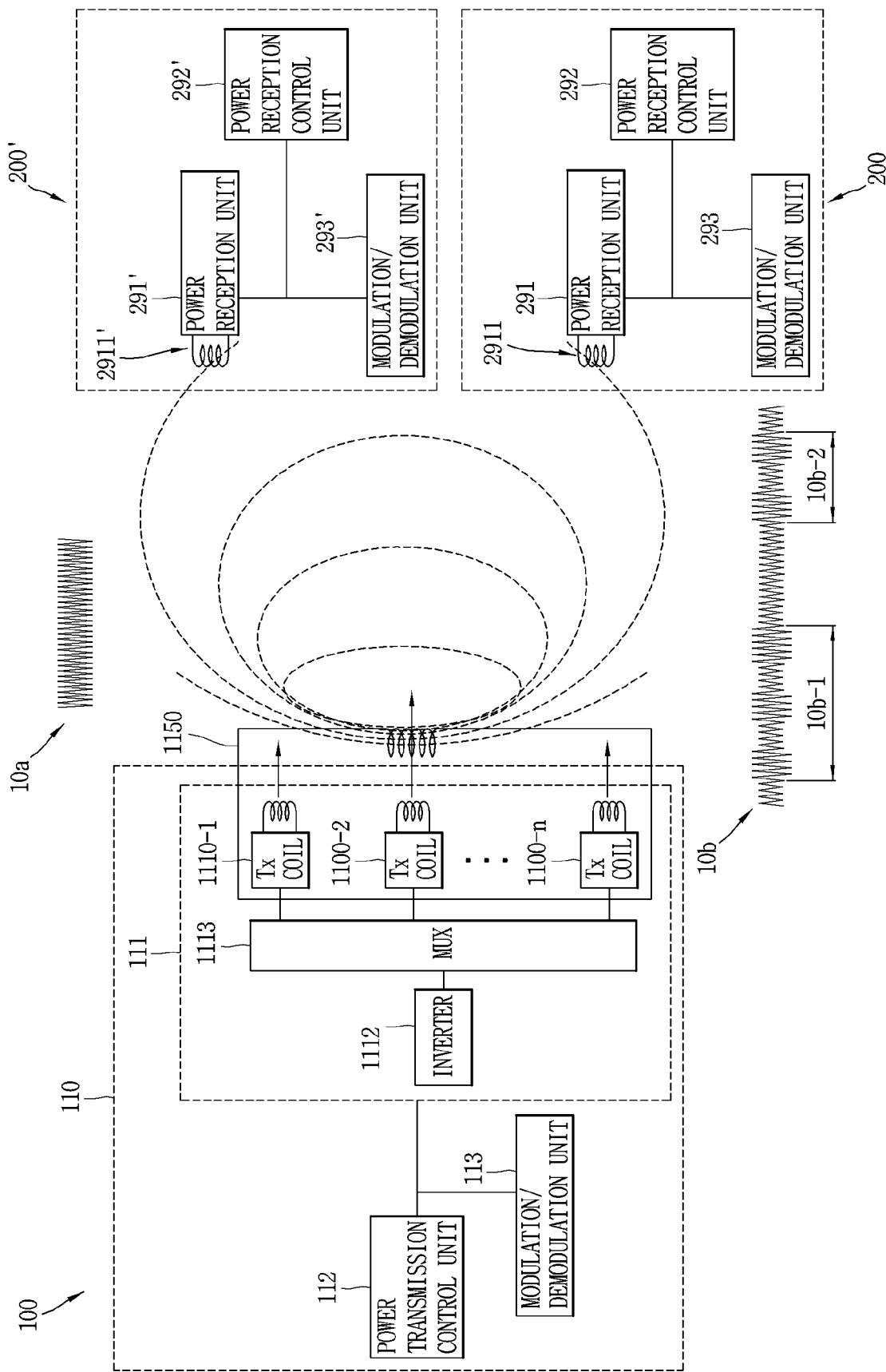
FIG. 23 shows a configuration of a wireless power transmission system including a wireless power transmission apparatus and one or more electronic devices.

Referring to FIG. 23, the wireless power transmission system includes a wireless power transmission apparatus 100 including a plurality of transmission coils 1100 and a wireless power reception apparatus. The wireless power reception apparatus may include first and second wireless power reception apparatuses 200, 200'. Meanwhile, the wireless power reception apparatus is shown to include two or more wireless power reception apparatuses, but is not limited thereto.

Hereinafter, a method of allowing one wireless power transmission apparatus to perform communication with one or more electronic devices, that is, wireless power reception apparatuses using a wireless power signal will be described. The wireless power transmission apparatus 100 may transmit power to one or more wireless power reception apparatuses 200, 200'. FIG. 23 illustrates two electronic devices 200 and 200', but the methods according to the exemplary embodiments disclosed herein may not be limited to the number of electronic devices shown.

An active area and a detection area may be different according to the wireless power transmission method of the wireless power transmission apparatus 100. Therefore, the wireless power transmission apparatus 100 may determine whether there is a wireless power reception apparatus located on the active area or the detection area according to the resonance coupling method or a wireless power reception apparatus located on the active area or the detection area according to the induction coupling method. According to the determination result, the wireless power transmission apparatus 100 which supports each wireless power transmission method may change the power transmission method for each wireless power reception apparatus.

In the wireless power transmission according to the exemplary embodiments disclosed herein, when the wireless power transmission apparatus 100 transmits power to the one or more electronic devices 200, 200' according to the same wireless power transmission method, the electronic devices 200, 200' may perform communications through the wireless power signals without inter-collision.

Referring to FIG. 23, a wireless power signal 10a generated by the wireless power transmission apparatus 100 may arrive at the first electronic device 200' and the second electronic device 200, respectively. The first and second electronic devices 200' and 200 may transmit wireless power messages using the generated wireless power signal 10a.

The first electronic device 200' and the second electronic device 200 may operate as wireless power reception apparatuses for receiving a wireless power signal. The wireless power reception apparatus according to embodiments disclosed herein may include a power reception unit 291', 291 that receives the generated wireless power signal, a modulation/demodulation unit 293', 293 that modulates or demodulates the received wireless power signal, and a control unit 292', 292 that controls each element of the wireless power reception apparatus.

An area (or region) to which the wireless power signal can be approached may be divided into two types. First, an active area denotes a region through which a wireless power signal transmitting power to the wireless power reception apparatus 200 is passed. Next, a detection area (semi-active area) denotes an interest region in which the wireless power transmission apparatus 100 can detect the presence of the wireless power reception apparatus 200. Here, the control unit 112 may detect whether the wireless power reception apparatus 200 is placed in the active area or detection area or removed from the area. Hereinafter, the active area or detection area will be commonly referred to as a "power transmission area".

As illustrated in FIG. 23, one or more transmission coils 110-1 to 1100-n may be mounted on a lower portion of an interface surface. That is, the one or more transmission coils 1110-1 to 1110-n may be located in the power transmission areas, respectively. A transmission coil disposed to correspond to each power transmission area may be driven independently or simultaneously with coils disposed in other power transmission areas.

Referring to FIGS. 1 to 23, the wireless power transmission apparatus 100 may include a plurality of transmission coils 1100 and shielding coils 1150. The wireless power transmission apparatus 100 may further include a capacitor 1160.

The plurality of transmission coils 1100 are configured to transmit wireless power to the wireless power reception apparatuses 200, 200'. Each of the plurality of transmission coils 1100 may defined as a coil having a predetermined shape having a plurality of turns and having an inner diameter and an outer diameter, for instance, a rectangular shape, a polygonal shape, or a circular shape.

The shielding coil 1150 is disposed on at least one surface of a dielectric substrate, that is, a PCB 1110a, 1110b, and is configured in a loop shape having two or more turns to surround the plurality of transmission coils 1100. When the shielding coils 1150 are disposed on different layers of the PCB 1110a, 1110b, respective conductive wires may be connected through via holes. The capacitor 1160 is configured to be connected to the shielding coil 1150 at one point of the shielding coil 1150.

The wireless power reception apparatus 200, 200' includes the reception coil 2911, 2911' and is configured to receive wireless power from the wireless power transmission apparatus 100.

The plurality of transmission coils 1100 may be disposed inside the shielding coil 1150 disposed on the dielectric substrate, that is, the PCB 1100a, 1100b. A direction of a magnetic field formed on one side and the other side of the plurality of transmission coils 1100 adjacent to the shielding coil 1150 is opposite to that of a magnetic field formed on the shielding coil 1150. Accordingly, the shielding coil 1150 may be configured to shield external exposure of electromagnetic waves by the plurality of transmission coils 1110.

The wireless power transmission apparatus 100 may perform communication for wireless power transmission with the wireless power reception apparatus 200. To this end, the wireless power transmission apparatus 100 may further include a first communication module 1200a, a second communication module 1200b, and a control unit 112. The first communication module 1200a may detect a wireless power reception apparatus located in any one of power transmission areas corresponding to the plurality of transmission coils 1100, respectively. The second communication module 1200b may operate when wireless power is transmitted to a wireless power reception apparatus located in any one power transmission area. The control unit 112 may be configured to transmit wireless power to a wireless power reception apparatus located in any one power transmission area and to control the capacitor 1150 so as to shield electromagnetic wave exposure due to the transmission of wireless power.

The plurality of transmission coils 1100 may include an upper coil 1100-1 and a lower coil 1100-2, 1100-3, but the present disclosure is not limited thereto. The plurality of transmission coils 1100 may include n transmission coils as shown in FIG. 16. In this regard, a structure in which structures including the upper coil 1100-1 and the lower coil 1100-2, 1100-3 are disposed in an overlapping manner may be extended. A structure including the upper coil 1100-1 and the lower coil 1100-2, 1100-3 may also extend in a y-axis direction as well as in one axial direction, an x-axis direction.

The upper coil 1100-1 may be disposed on a first layer. The first lower coil 1100-2 may be disposed on a second layer that is a lower layer of the first layer to overlap one side of the upper coil 1100-1. The second lower coil 1100-2 may be disposed on the second layer to overlap the other side of the upper coil 1100-1. For an example, the lower coil 1100-2, 1100-3 may be disposed on a ferrite substrate 1100f. The upper coil 1100-1 may be disposed in an upper region of the lower coil 1100-2, 1100-3. For an example, the upper coil 1100-1 may be electrically spaced apart from the lower coil 1100-2, 1100-3 through an adhesive and disposed in the upper region of the lower coil 1100-2, 1100-3, but is not limited thereto.

Meanwhile, the wireless power transmission apparatus 100 may further include a switch SW disposed between the capacitor 1160 and the shielding coil 1150 to control the capacitor 1160 to be connected to or opened from the shielding coil 1150. The control unit 112 may determine whether the wireless power reception apparatus 200 is disposed on the upper coil 1100-1 or the first or second lower coil 1100-2 or 1100-3. When the wireless power reception apparatus 200 is disposed in an upper coil region, the control unit 112 may control the switch SW to connect the capacitor 1160 to the shielding coil 1150 so as to shield electromagnetic wave exposure due to the transmission of wireless power. On the contrary, when the wireless power reception apparatus 200' is disposed in a first or second coil region, the switch SW may be controlled to open the capacitor 1160 so as not to be connected to the shielding coil 1150.

Various changes and modifications to the above-described embodiments related to a wireless power transmission apparatus having a plurality of transmission coils and shielding coils, a wireless power transmission system having the same, and a control operation thereof may be clearly understood by those skilled in the art within the concept and scope of the present disclosure. Accordingly, it should be understood that various changes and modifications to the embodiments fall within the scope of the following claims.

In the above, a wireless power transmission apparatus having a plurality of transmission coils and shielding coils and a wireless power transmission system including the same have been described. Technical effects of a wireless power transmission apparatus having a plurality of transmission coils and shielding coils and a wireless power transmission system including the same will be described as follows.

According to the present specification, when charging one or more electronic devices, it may be possible to secure a wide active area and ensure a degree of positional freedom of wireless charging.

According to the present specification, leakage electromagnetic waves leaking to an external region may be shielded while maintaining wireless charging efficiency.

According to the present specification, when charging one or more electronic devices, leakage electromagnetic waves leaking to an external region may be shielded while securing a wide active area.

According to the present specification, when charging one or more electronic devices, leakage electromagnetic waves leaking to an external region may be shielded while securing a degree of positional freedom of wireless charging.

Further scope of applicability of the present disclosure will become apparent from the detailed description given hereinafter. It should be understood, however, that the detailed description and specific examples, such as the preferred embodiment of the invention, are given by way of illustration only, since various changes and modifications within the spirit and scope of the invention will be apparent to those skilled in the art.

In connection with the present disclosure described above, a wireless power transmission apparatus having a plurality of transmission coils and shielding coils, a wireless power transmission system having the same, and a control operation thereof may be implemented by software, firmware, or a combination thereof. On the other hand, a configuration that performs control on a wireless power transmission apparatus having a plurality of transmission coils and shielding coils and a wireless power transmission system including the same may be implemented as computer-readable codes on a program-recorded medium. The computer-readable medium may include all types of recording devices each storing data readable by a computer system. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the control unit, namely, the processor of the terminal or the vehicle. Therefore, it should also be understood that the foregoing description is not limitedly construed in all aspects and is considered to be illustrative. Therefore, all changes and modifications that fall within the metes and bounds of the claims, or equivalents of such metes and bounds are therefore intended to be embraced by the appended claims.

The invention claimed is:

1. A wireless power transmission apparatus comprising:
    a plurality of transmission coils configured to transmit wireless power to a wireless power reception apparatus;
    a shielding coil disposed on at least one surface of a dielectric substrate, and configured in a loop shape having two or more turns to surround the plurality of transmission coils; and
    a capacitor configured to connect one point and another point of the shielding coil, wherein the plurality of transmission coils are disposed inside the shielding coil disposed on the dielectric substrate, and
    wherein a direction of a magnetic field formed on one side and the other side of the plurality of transmission coils adjacent to the shielding coil is formed in an opposite direction to a magnetic field formed on the shielding coil such that the shielding coil is configured to shield external exposure of electromagnetic waves due to the plurality of transmission coils, and
    wherein a resonant frequency of the shielding coil due to an inductance component of the shielding coil and a capacitance component of the capacitor is set to a frequency lower than a wireless charging operating frequency due to the plurality of transmission coils, and
    wherein the plurality of transmission coils comprise:
    an upper coil disposed on a first layer;
    a first lower coil disposed on a second layer that is a lower layer of the first layer to overlap one side of the upper coil; and
    a second lower coil disposed on the second layer to overlap the other side of the upper coil,
    wherein one side of the first lower coil and the other side of the second lower coil are disposed in parallel to and spaced apart from the shielding coil.

2. The wireless power transmission apparatus of claim 1, wherein the capacitance value is set such that a first impedance due to an inductance component of the plurality of transmission coils and the shielding coil is 10 times greater than a second impedance due to a capacitance value of the capacitor connected to the shielding coil, and
    wherein due to the set capacitance value, a phase value of a current flowing through the shielding coil and a phase value of a current flowing through the transmission coil are an out-of-phase relationship.

3. The wireless power transmission apparatus of claim 1, wherein the plurality of transmission coils are disposed inside a hole disposed in the dielectric substrate.

4. The wireless power transmission apparatus of claim 1, wherein the shielding coil comprises:
- a first shielding coil disposed on one surface of the dielectric substrate to surround the plurality of transmission coils; and
- a second shielding coil disposed on the other surface of the dielectric substrate to surround the plurality of transmission coils.

5. The wireless power transmission apparatus of claim 4, wherein a shape of the second shielding coil corresponds to that of the first shielding coil,
- wherein a second region of a rear surface of the dielectric substrate on which the second shielding coil is disposed corresponds to a first region of a front surface of the dielectric substrate on which the first shielding coil is disposed, and
- wherein a shape of a corner portion on one side where the second shielding coil is disposed is defined to be different from that of a corner portion on one side where the first shielding coil is disposed.

6. The wireless power transmission apparatus of claim 4, wherein the capacitor is configured to connect an inner end portion and an outer end portion of either one of the first shielding coil and the second shielding coil,
- wherein the first shielding coil is defined in a two-turn closed loop shape on one surface of the dielectric substrate, and
- wherein the second shielding coil is defined in a two-turn closed loop shape on the other surface of the dielectric substrate.

7. The wireless power transmission apparatus of claim 1, further comprising:
- a first communication module that detects a wireless power reception apparatus located in any one of power transmission areas corresponding to the plurality of transmission coils, respectively; and
- a control unit configured to transmit wireless power to a wireless power reception apparatus located in any one of the power transmission areas and to control the capacitor so as to shield electromagnetic wave exposure due to the transmission of wireless power.

8. The wireless power transmission apparatus of claim 7, further comprising:
- a switch disposed between the capacitor and the shielding coil to control the capacitor to be connected to or opened from the shielding coil,
- wherein the control unit controls the switch to connect the capacitor to the shielding coil so as to shield electromagnetic wave exposure due to the transmission of wireless power when it is determined that the wireless power reception apparatus is disposed on the upper coil, and controls the switch to open the capacitor so as not to be connected to the shielding coil when it is determined that the wireless power reception apparatus is disposed on the first lower coil or the second lower coil.

9. The wireless power transmission apparatus of claim 8, wherein the control unit controls the switch to connect the capacitor to the shielding coil so as to shield electromagnetic wave exposure due to the transmission of wireless power when it is determined that the wireless power reception apparatus is disposed on the first lower coil or the second lower coil and the electromagnetic wave exposure due to the transmission of wireless power is above a threshold value.

10. The wireless power transmission apparatus of claim 8, further comprising:
- a second communication module that transmits and receives a power control message to and from a wireless power reception apparatus in response to the detection of the wireless power reception apparatus located in one of the power transmission areas through the first communication module,
- wherein the control unit controls the switch to transmit wireless power to a wireless power reception apparatus located in one of the power transmission areas and to shield electromagnetic wave exposure due to the transmission of wireless power based on the power control message.

11. The wireless power transmission apparatus of claim 1, wherein a shape of the upper coil is defined in a form in which a plurality of coils wound in a rectangular shape, and a corner portion of the upper coil is defined in a round shape,
- wherein the upper coil is configured with a rectangular coil having an inner diameter and an outer diameter, and
- wherein a first coil region on one side of the first lower coil and a second coil region on the other side of the second lower coil are disposed in an inner region of the upper coil.

12. The wireless power transmission apparatus of claim 11, wherein a shape of the first and second lower coils is defined in a form in which a plurality of coils are wound in a rectangular shape, and corner portions of the first and second lower coils are defined in a round shape,
- wherein the first and second lower coils are configured with rectangular coils having an inner diameter and an outer diameter, and
- wherein the other side of the first lower coil and one side of the second lower coil are disposed adjacent to and spaced apart from the shielding coil, and configured to shield electromagnetic wave exposure due to wireless power transmission.

13. The wireless power transmission apparatus of claim 7, wherein the capacitor is configured with a variable capacitor, and
- wherein the control unit controls the variable capacitor such that a resonant frequency of the shielding coil is set to a frequency lower than a wireless charging operating frequency due to the plurality of transmission coils.

14. The wireless power transmission apparatus of claim 13, wherein the control unit controls the variable capacitor to have a frequency lower than the wireless charging operating frequency while increasing the resonant frequency of the shielding coil when an amount of power is above a threshold value according to wireless power transmission.

15. The wireless power transmission apparatus of claim 1, wherein a first distance between a boundary of the other side of the first lower coil and the shielding coil and a second distance between a boundary of one side of the second lower coil and the shielding coil are set to be below a first threshold distance,
- wherein a third distance between an upper end portion of the plurality of transmission coils and the shielding coil and a fourth distance between a lower end portion of the plurality of transmission coils and the shielding coil are set to be below a second threshold distance.

16. A wireless power transmission system including a wireless power transmission apparatus and a wireless power reception apparatus, the wireless power transmission system comprising:
- a plurality of transmission coils configured to transmit wireless power to a wireless power reception apparatus;

a shielding coil disposed on at least one surface of a dielectric substrate, and configured in a loop shape having two or more turns to surround the plurality of transmission coils;

a wireless power transmission apparatus comprising a capacitor configured to be connected to the shielding coil at one point of the shielding coil; and a wireless power reception apparatus provided with a reception coil to receive wireless power from the wireless power transmission apparatus, wherein the plurality of transmission coils are disposed inside the shielding coil disposed on the dielectric substrate, and wherein a direction of a magnetic field formed on one side and the other side of the plurality of transmission coils adjacent to the shielding coil is formed in an opposite direction to a magnetic field formed on the shielding coil such that the shielding coil is configured to shield external exposure of electromagnetic waves due to the plurality of transmission coils, wherein the wireless power transmission apparatus further comprises:

a first communication module that detects a wireless power reception apparatus located in any one of power transmission areas corresponding to the plurality of transmission coils, respectively; and a control unit configured to transmit wireless power to a wireless power reception apparatus located in the any one of the power transmission areas and to control the capacitor so as to shield electromagnetic wave exposure due to the transmission of wireless power, and wherein the plurality of transmission coils comprise:

an upper coil disposed on a first layer;

a first lower coil disposed on a second layer that is a lower layer of the first layer to overlap one side of the upper coil; and a second lower coil disposed on the second layer to overlap the other side of the upper coil.

17. The wireless power transmission system of claim 16, wherein the wireless power transmission apparatus further comprises:

a switch disposed between the capacitor and the shielding coil to control the capacitor to be connected to or opened from the shielding coil, and wherein the control unit controls the switch to connect the capacitor to the shielding coil so as to shield electromagnetic wave exposure due to the transmission of wireless power when it is determined that the wireless power reception apparatus is disposed on the upper coil, and controls the switch to open the capacitor so as not to be connected to the shielding coil when it is determined that the wireless power reception apparatus is disposed on the first lower coil or the second lower coil.

* * * * *